US012611624B2

(12) United States Patent
Holzmann et al.

(10) Patent No.: US 12,611,624 B2
(45) Date of Patent: Apr. 28, 2026

(54) PROTUBERANT COMPRESSIBLE FILTER SEAL DESIGN UTILIZING UNDERCUTS

(71) Applicant: CUMMINS FILTRATION INC., Nashville, TN (US)

(72) Inventors: Mark V. Holzmann, Stoughton, WI (US); Austin Schafer, Kingwood, TX (US); Lucas Canik, Edgerton, WI (US); Scott Gerald Manke, Sun Prairie, WI (US); Rajath Martin, Madison, WI (US)

(73) Assignee: Atmus Filtration Inc., Nashville, TN (US)

( * ) Notice: Subject to any disclaimer, the term of this patent is extended or adjusted under 35 U.S.C. 154(b) by 858 days.

(21) Appl. No.: 17/786,629

(22) PCT Filed: Dec. 17, 2020

(86) PCT No.: PCT/US2020/065533
§ 371 (c)(1),
(2) Date: Jun. 17, 2022

(87) PCT Pub. No.: WO2021/127130
PCT Pub. Date: Jun. 24, 2021

(65) Prior Publication Data
US 2023/0032889 A1 Feb. 2, 2023

Related U.S. Application Data

(60) Provisional application No. 62/949,538, filed on Dec. 18, 2019.

(51) Int. Cl.
B01D 46/00 (2022.01)
B01D 46/52 (2006.01)
(Continued)

(52) U.S. Cl.
CPC ....... B01D 46/0002 (2013.01); B01D 46/521 (2013.01); B01D 46/64 (2022.01);
(Continued)

(58) Field of Classification Search
CPC .. B01D 46/0002; B01D 46/521; B01D 46/64; B01D 2271/027; B01D 2275/208;
(Continued)

(56) References Cited

U.S. PATENT DOCUMENTS 4,113,627 A 9/1978 Leason
5,484,466 A 1/1996 Brown et al.
(Continued)

FOREIGN PATENT DOCUMENTS

CN 102046257 A 5/2011
CN 104994930 A 10/2015
(Continued)

OTHER PUBLICATIONS

EPO Search Report dtd Dec. 20, 2023 re EPO Appl 20901666.6.
(Continued)

*Primary Examiner* — Dung H Bui
(74) *Attorney, Agent, or Firm* — Foley & Lardner LLP

(57) ABSTRACT

Various embodiments relate to a filter housing seal member. The filter housing seal member includes a first member end and a second member end disposed axially away from the first member end. A first member portion is disposed between the first member end and the second member end. A second member portion is disposed between the first member end and the second member end. The second member portion is disposed radially away from the first member portion. An undercut is positioned along the first member portion, the undercut configured to receive and form a seal with a filter seal member of a filter element.

21 Claims, 23 Drawing Sheets

(51) Int. Cl.
    *B01D 46/64* (2022.01)
    *F02M 35/024* (2006.01)
(52) U.S. Cl.
    CPC ................. *F02M 35/02441* (2013.01); *F02M 35/02483* (2013.01); *B01D 2271/027* (2013.01); *B01D 2275/208* (2013.01); *B01D 2279/60* (2013.01)
(58) Field of Classification Search
    CPC .......... B01D 2279/60; B01D 2265/026; B01D 46/2414; F02M 35/02441; F02M 35/02483; F02M 35/0202; F02M 35/0209; F02M 35/024; F02M 35/02408; F02M 35/02416; F02M 35/0201
    See application file for complete search history.

(56) References Cited

U.S. PATENT DOCUMENTS

| | | | |
|---|---|---|---|
| 8,397,920 B2 | 3/2013 | Moy et al. | |
| 9,636,615 B2 | 5/2017 | Osendorf et al. | |
| 11,724,220 B2 * | 8/2023 | Ouweleen | B01D 46/24 210/232 |
| 2008/0066434 A1 * | 3/2008 | Kuempel | B01D 46/0005 55/497 |
| 2009/0249756 A1 | 10/2009 | Schrage et al. | |
| 2009/0266041 A1 * | 10/2009 | Schrage | B01D 46/2411 55/498 |
| 2012/0181224 A1 | 7/2012 | Rapin | |
| 2015/0096931 A1 | 4/2015 | Jensen | |
| 2015/0328575 A1 | 11/2015 | Campbell et al. | |
| 2016/0144310 A1 * | 5/2016 | Movia | B01D 46/2411 55/498 |
| 2017/0246571 A1 * | 8/2017 | Adamek | B01D 46/0001 |
| 2018/0372036 A1 | 12/2018 | Von Seggern et al. | |
| 2019/0046915 A1 * | 2/2019 | Gieseke | B01D 46/527 |
| 2019/0160398 A1 | 5/2019 | Jokschas et al. | |
| 2019/0299143 A1 | 10/2019 | Decoster et al. | |
| 2020/0086263 A1 * | 3/2020 | Mattox | B01D 46/4272 |
| 2020/0114292 A1 * | 4/2020 | Reichter | B01D 46/526 |
| 2021/0046415 A1 * | 2/2021 | Tiffany | B01D 46/526 |
| 2022/0018316 A1 * | 1/2022 | Holzmann | F02M 35/02441 |

FOREIGN PATENT DOCUMENTS

| | | |
|---|---|---|
| DE | 10 2011 106 502 A1 | 12/2012 |
| DE | 10 2015 004 089 A1 | 12/2015 |
| EP | 2 140 922 A3 | 1/2010 |
| WO | WO-2019/112898 | 6/2019 |
| WO | WO-2020/112536 A1 | 6/2020 |
| WO | WO-2020/231769 | 11/2020 |

OTHER PUBLICATIONS

First Office Action issued for Chinese Patent Application No. 202080086470.8 issued Aug. 21, 2023, 7 pages.
Second Office Action issued for Chinese Patent Application No. 202080086470.8 issued Apr. 27, 2024, 6 pages.
International Search Report and Written Opinion issued for PCT Application No. PCT PCT/US2020/065533 issued Mar. 15, 2021, 20 pages.

* cited by examiner

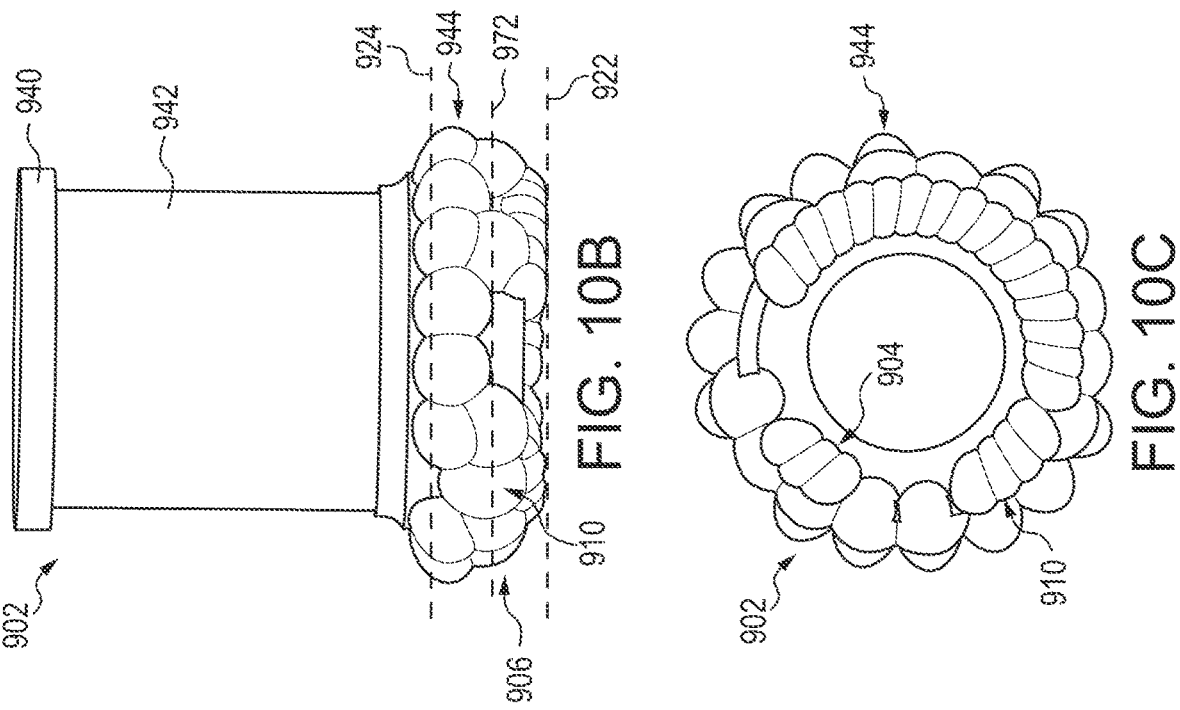
FIG. 10B
FIG. 10C
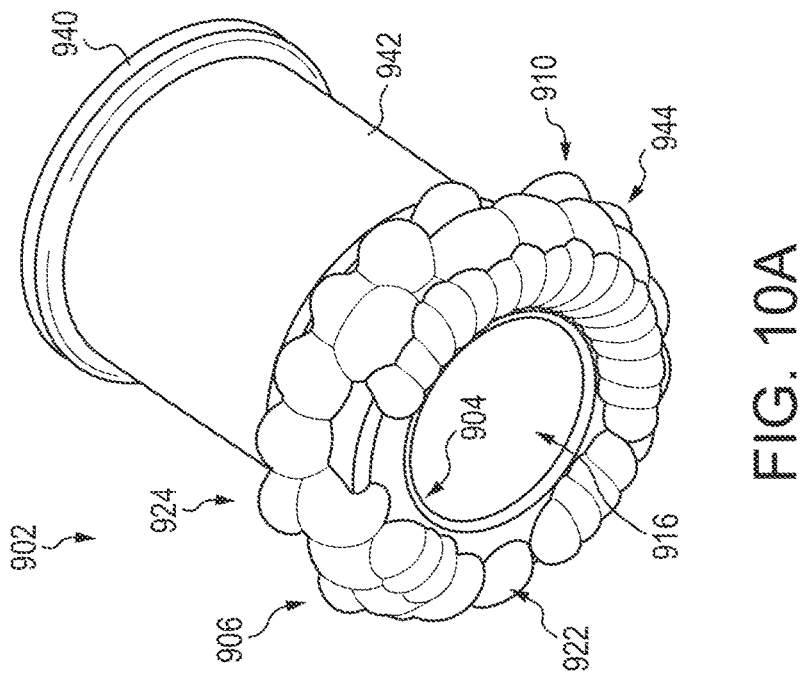
FIG. 10A

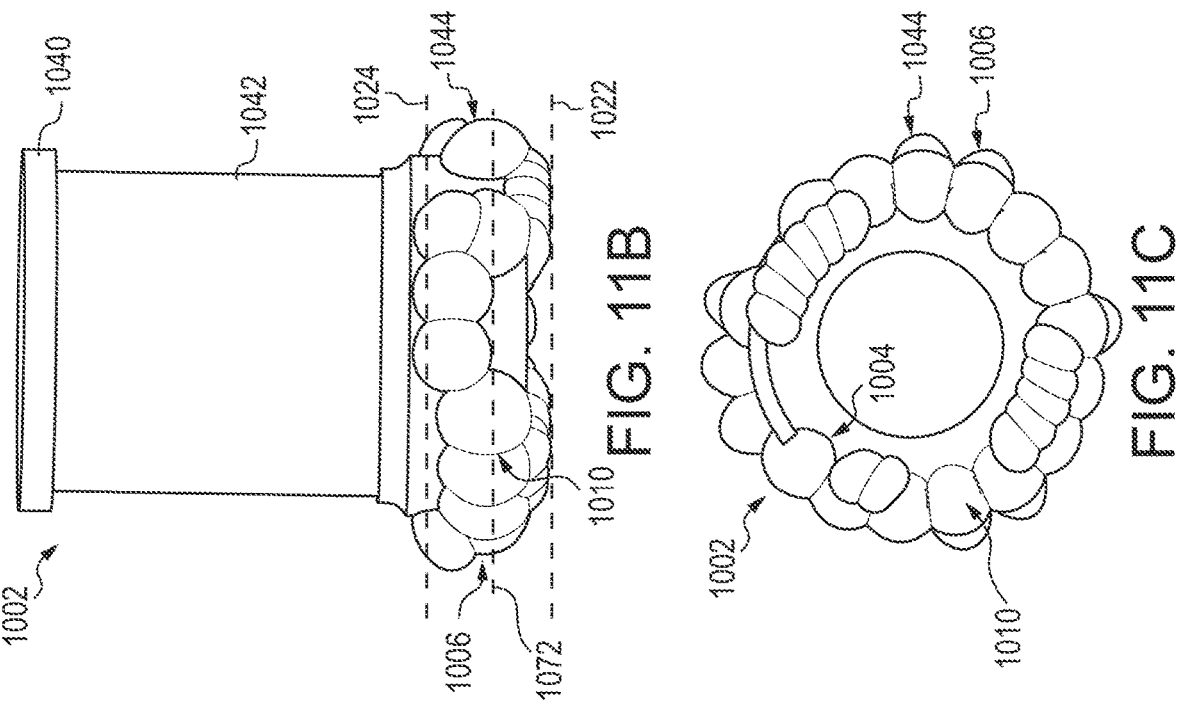
FIG. 11B
FIG. 11C
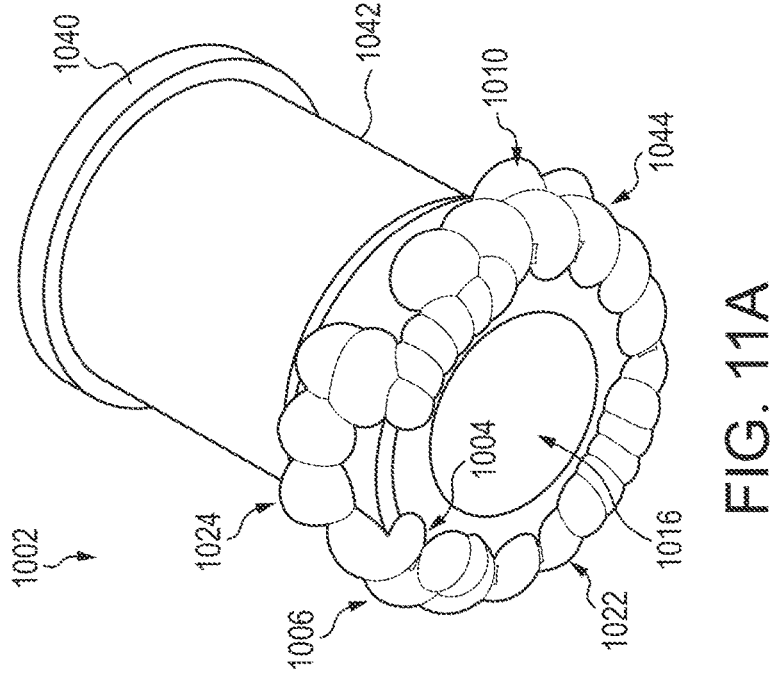
FIG. 11A

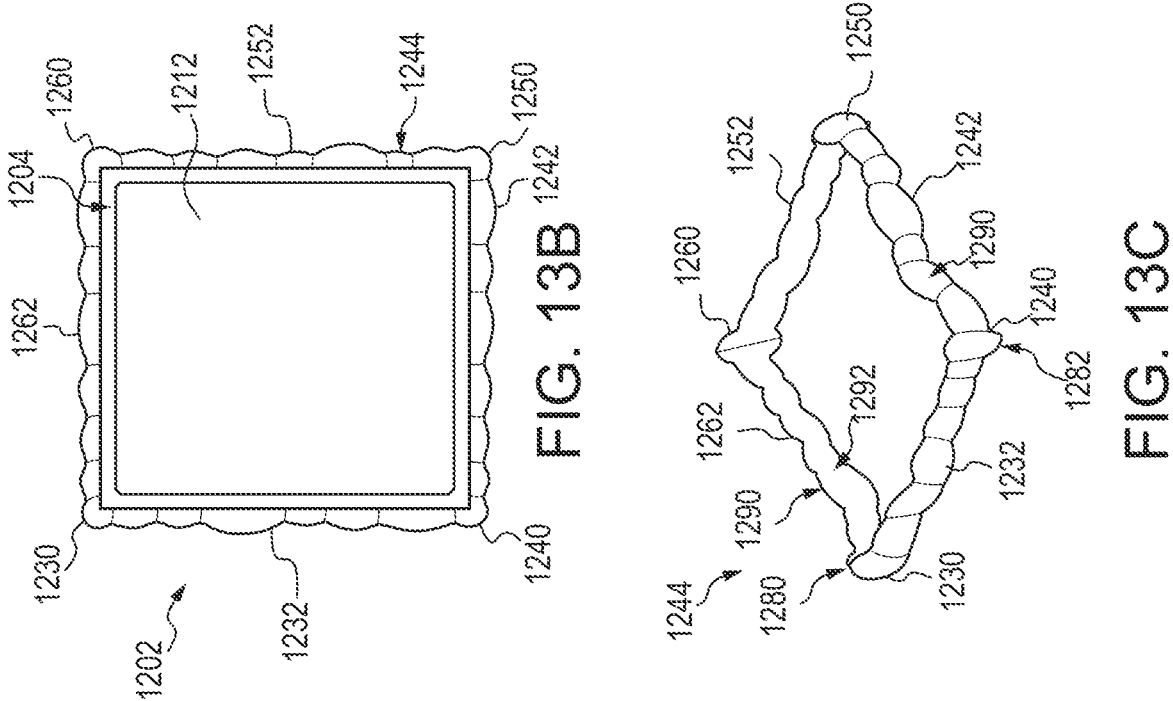
FIG. 13B
FIG. 13C
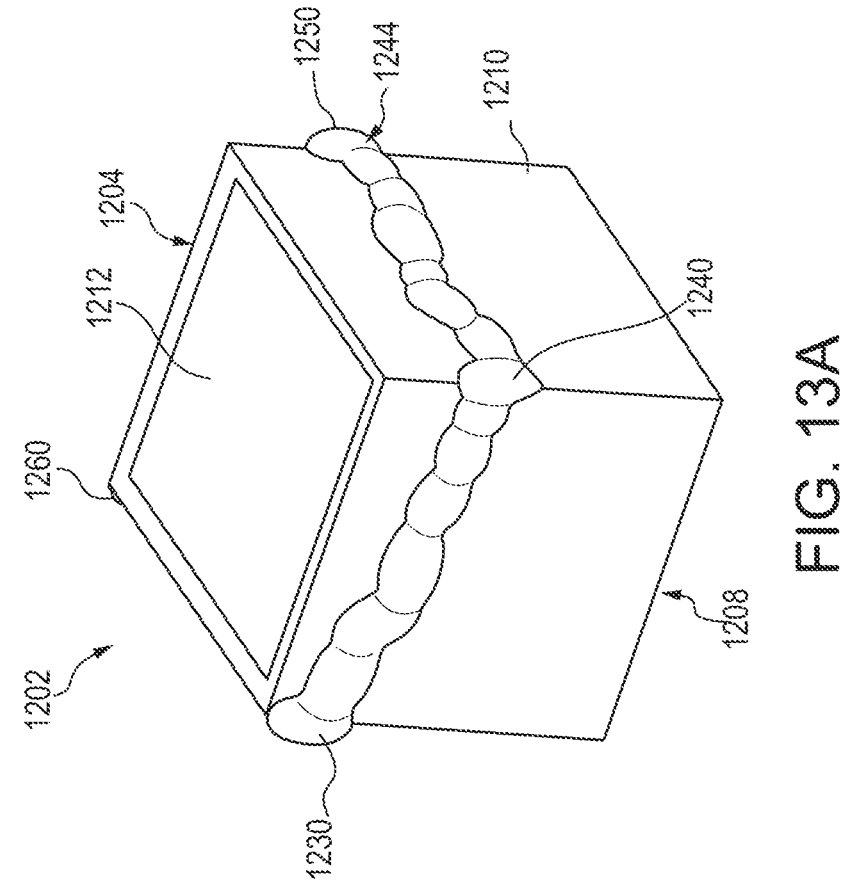
FIG. 13A

PROTUBERANT COMPRESSIBLE FILTER SEAL DESIGN UTILIZING UNDERCUTS

CROSS-REFERENCE TO RELATED PATENT APPLICATIONS

This application is a national phase based on PCT/US2020/065533, filed Dec. 17, 2020, which claims the benefit of and priority to U.S. Provisional Application No. 62/949,538, filed on Dec. 18, 2019. The contents of these applications are incorporated by reference in their entireties.

FIELD

The present invention relates generally to air filtration systems for use with internal combustion engines or the like.

BACKGROUND

Internal combustion engines generally combust a mixture of fuel (e.g., gasoline, diesel, natural gas, etc.) and air. Many or all of the fluids passing through the internal combustion engine are filtered through a filtration system to remove particulate and contaminants from the fluids prior to entering the internal combustion engine. The filtration system may have a primary filter element and a secondary filter element disposed within the primary filter element. The filter media of the filter elements capture and removes particulate from the intake air passing through the filter media. A number of conventional filtration systems make use of one or multiple seal members along the filter element(s). The integrity and proper installation of the seal member(s) is integral to the proper functioning of the filtration system.

SUMMARY

Various embodiments relate to a filter housing seal member. The filter housing seal member includes a first member end and a second member end disposed axially away from the first member end. A first member portion is disposed between the first member end and the second member end. A second member portion is disposed between the first member end and the second member end. The second member portion is disposed radially away from the first member portion. An undercut is positioned along the first member portion, the undercut configured to receive and form a seal with a filter seal member of a filter element.

Other embodiments relate to a filtration system. The filtration system includes a filter housing defining an internal cavity. The filter housing includes a first housing end and a second housing end disposed axially away from the first housing end. A housing seal member is adjacent to the second housing end. The housing seal member defines a member channel configured to receive a filter seal member. A filter element is disposed within the internal cavity. The filter element includes a first filter end and a second filter end disposed axially away from the first filter end. Filter media is disposed between the first filter end and the second filter end. The filter seal member is formed on the second filter end. The filter seal member includes a first plurality of lobes and a second plurality of lobes. Each lobe in the second plurality of lobes is positioned between a pair of lobes in first the plurality of lobes.

Other embodiments relate to a filter element. The filter element includes a first filter end and a second filter end disposed axially away from the first filter end. Filter media is disposed between the first filter end and the second filter end. A filter seal member is formed on the second filter end. The filter seal member includes a first plurality of lobes and a second plurality of lobes. Each lobe in the second plurality of lobes is positioned between a pair of lobes in the first plurality of lobes. At least one lobe in the first plurality of lobes comprises a tab protruding away from the filter seal member.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 10A is a perspective view of a filter element with an irregularly patterned seal member, according to an example embodiment.

FIG. 10B is a side view of the filter element with an irregularly patterned seal member of FIG. 10A.

FIG. 10C is a bottom view of the filter element with an irregularly patterned seal member of FIG. 10A.

FIG. 11A is a perspective view of a filter element with an irregularly patterned seal member, according to an example embodiment.

FIG. 11B is a side view of the filter element with an irregularly patterned seal member of FIG. 11A.

FIG. 11C is a bottom view of the filter element with an irregularly patterned seal member of FIG. 11A.

FIG. 13A is a perspective view of a filter element with a square lobe seal member, according to an example embodiment.

FIG. 13B is a top view of the filter element with the square lobe seal member of FIG. 13A.

FIG. 13C is a perspective view of the square lobe seal member of the filter element of FIG. 13A.

DETAILED DESCRIPTION

Figure 2:
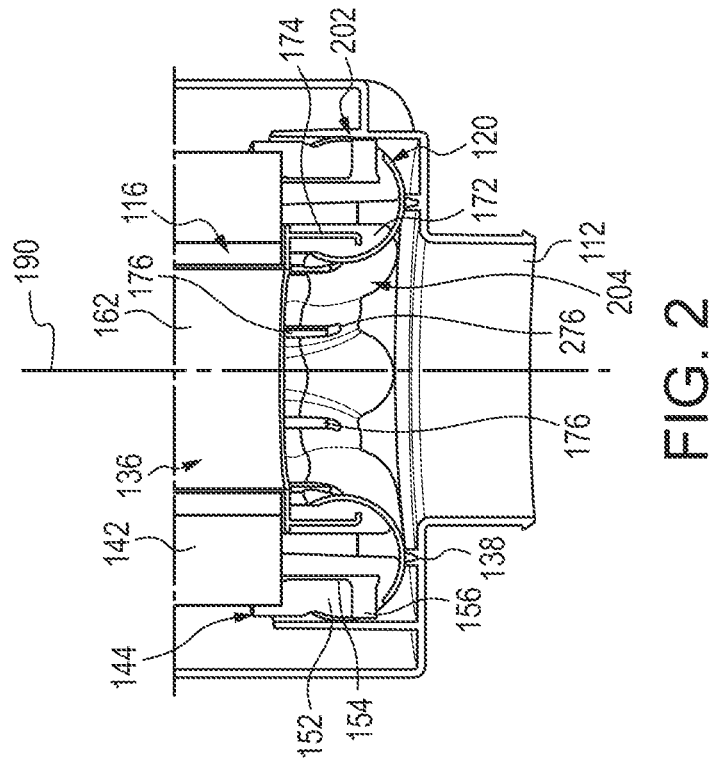
FIG. 2 is a cross-sectional side view of a portion of the filtration system of FIG. 1.

Referring to the figures generally, various embodiments disclosed herein relate to a filtration system with a filter element having a compressible filter seal member configured to ensure that the filter element is properly aligned when installed within a housing and that the filter element is locked into complementary undercuts in the housing when installed. Generally, the filter seal member orients (e.g., aligns) and locks (e.g., secures) a filter element into a circuitous datum seal zone by using an aligned undercut seal with tabs to assist in locking the filter element within a complementary seal ring (e.g., housing seal member) positioned in an end of a filter housing. In some embodiments, the filter seal member includes a plurality of lobes that are curved and bulbous in shape and form a bulbous urethane seal region that are connected to form a circuitous datum seal path reinforced by an internal flexible or rigid member (e.g., structural member) that forms at least one alignment tab (e.g., alignment member). In some embodiments, a plurality of tabs are implemented along lobes of the filter seal to align with a complementary seal ring. The curved undercut complementary lobes formed by the seal ring keep the filter element from easily translating back away from the seal zone—deterring sag of the filter element—as the seal member of the filter element is aligned and locked in positioned within the seal ring of the filter housing, along the central axis. In other words, the filter seal member is configured to form a seal path, which in some embodiments is reinforced by an internal flexible or rigid member that also acts as an alignment feature with the complementary feature in the filter housing. In some embodiments, the internal plastic features on the seal ring flex slightly when snap-fitting a filter element into a filter housing, and the internal plastic features reinforce the seal region by providing an extra distributed compressive force to keep filter from easily coming out of housing during vibration.

In some embodiments, the filtration system includes a pair of filter elements (e.g., a primary filter element and a secondary filter element) that each have a respective filter seal member that are configured to align with and lock within a complementary seal ring of the filter housing. In other embodiments, the filtration system includes a single filter element that is configured to align with and lock within a complementary seal ring of the filter housing. In either set of embodiments, the filter seal member may have one or more lobes having a bulbous shape that form a continuous (e.g., symmetrical) or discontinuous (e.g., irregular and non-symmetrical) pattern. In either set of embodiments, the seal ring has a complementary shape to the shape of the filter seal member(s) of the filter element(s). While the plurality of lobes are shown as having a first plurality of lobes having identical size and shape and a second plurality of lobes between the first plurality of lobes having an identical size and shape and a different size and shape from the first plurality of lobes. In some embodiments, the plurality of lobes along the filter seal member may have different shapes, sizes, and/or configurations compared to other plurality of lobes along the filter seal member. The plurality of lobes may be configured to have a wide range of lobes (e.g., 1-28) with various periodicity angles and curved shapes, for example, the filter seal members may have lobes of 1, 2, 3, 4, 5, 6, 8, 10, 12, 15, 18, 20, 24, 30, 36, 48, 60, 72, 90, 100, 120, 190, or 360 in number that may be implemented having periodicity angles of 360, 180, 120, 90, 72, 60, 45, 36, 30, 24, 20, 18, 15, 12, 10, 7.5, 6, 5, 4, 3.6, 3, and 1-degrees, respectively. Other numbers of lobes (and periodicity angles) are also possible. As will be readily apparent, any change to the number, shape, location, angle, etc. of the lobes of the filter seal member will result in a change to the number, shape, location, angle, of lobes in the seal interface (e.g., seal surface, seal member interface, etc.).

Figure 1:
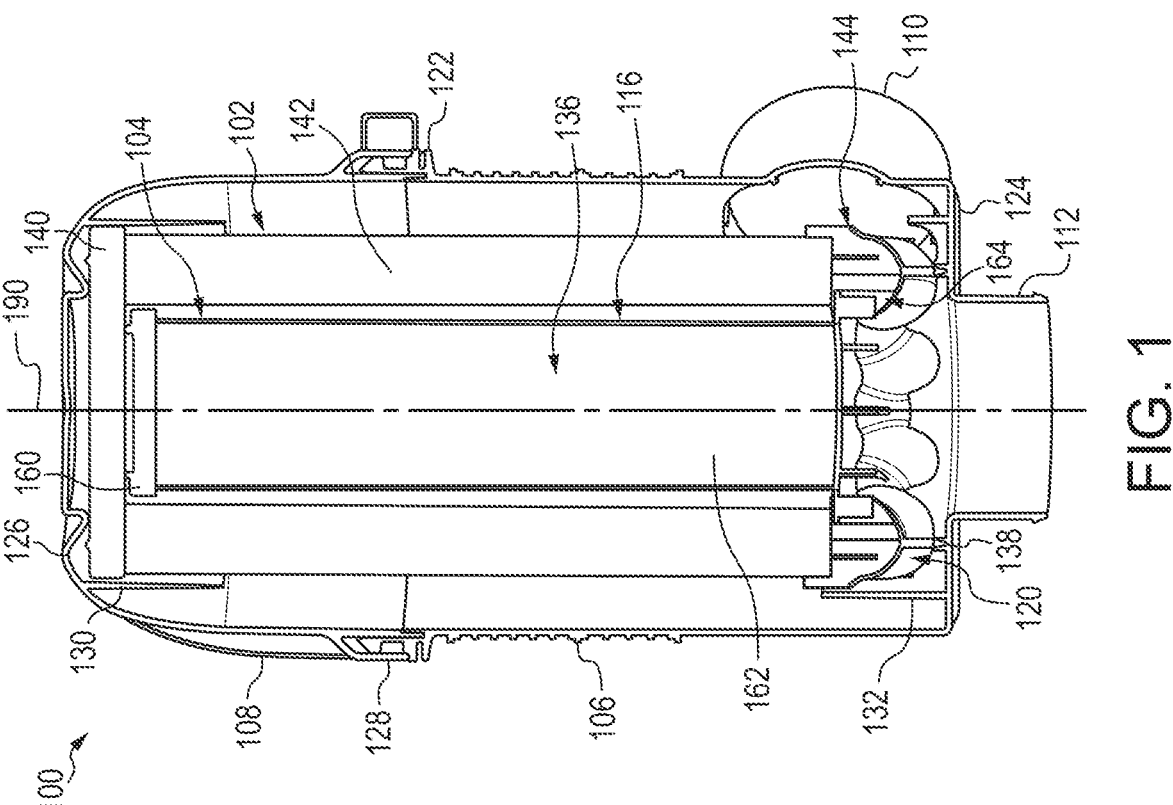
FIG. 1 is a cross-sectional side view of a filtration system having a first filter element with a seal member, a second filter element with a seal member, and a seal ring, according to an example embodiment.

Turning to FIG. 1, a filtration system 100 having a first filter element 102 (e.g., primary filter element) and a second filter element 104 (e.g., secondary filter element) disposed within a filter housing 106 and filter housing cover 108 is shown, according to an example embodiment. The first filter element 102 is positioned centrally along a central axis 190 of the filter housing 106 and the second filter element 104 is disposed centrally within the first filter element 102. The first filter element 102 includes a first seal member 144 that aligns with and engages an outer portion of a seal ring 120 (e.g., housing seal member) along the filter housing 106. The second filter element 104 includes a second seal member 164 that aligns with and engages an inner portion of a seal ring 120 along the filter housing 106. As described in greater detail below, the first seal member 144 and the second seal member 164 are complementary such that both are disposed within the seal ring 120 when the filter elements (e.g., first filter element 102 and second filter element 104) are properly installed within the filter housing 106.

The filter housing cover 108 includes a first cover end 126 and a second cover end 128 disposed axially away from the first cover end 126. The second cover end 128 is configured to couple with a first housing end 122 of the filter housing 106 such that the housing cover 108 is coupled to the filter housing 106. The first cover end 126 includes a top filter guidance member 130 that extends from the first cover end 126 axially toward the second cover end 128 and is configured to guide and receive a first endplate 140 of the first filter element 102.

The filter housing 106 includes a first housing end 122 and a second housing end 124 disposed axially away from the first housing end 122. The first housing end 122 is configured to couple the filter housing 106 to a filter housing cover 108. The second housing end 124 includes a pre-cleaning member 132, a filter inlet 110, a filter outlet 112, and a seal ring 120. As discussed in greater detail below, an alignment tab on the first filter element 102 and an alignment tab on the second filter element 104 interact with alignment pockets (e.g., slots) on the sealing ring 120 to guide filter into installation within the sealing surfaces. The seal ring 120 is coupled to the second housing end 124 along a coupler ring 138. In some embodiments, the seal ring 120 is formed with the filter housing 106 such that the seal ring 120 and the filter element 106 are a single, unitary element. In other embodiments, the seal ring 120 is coupled to the filter housing 106 along the coupler ring 138.

Figure 5A:
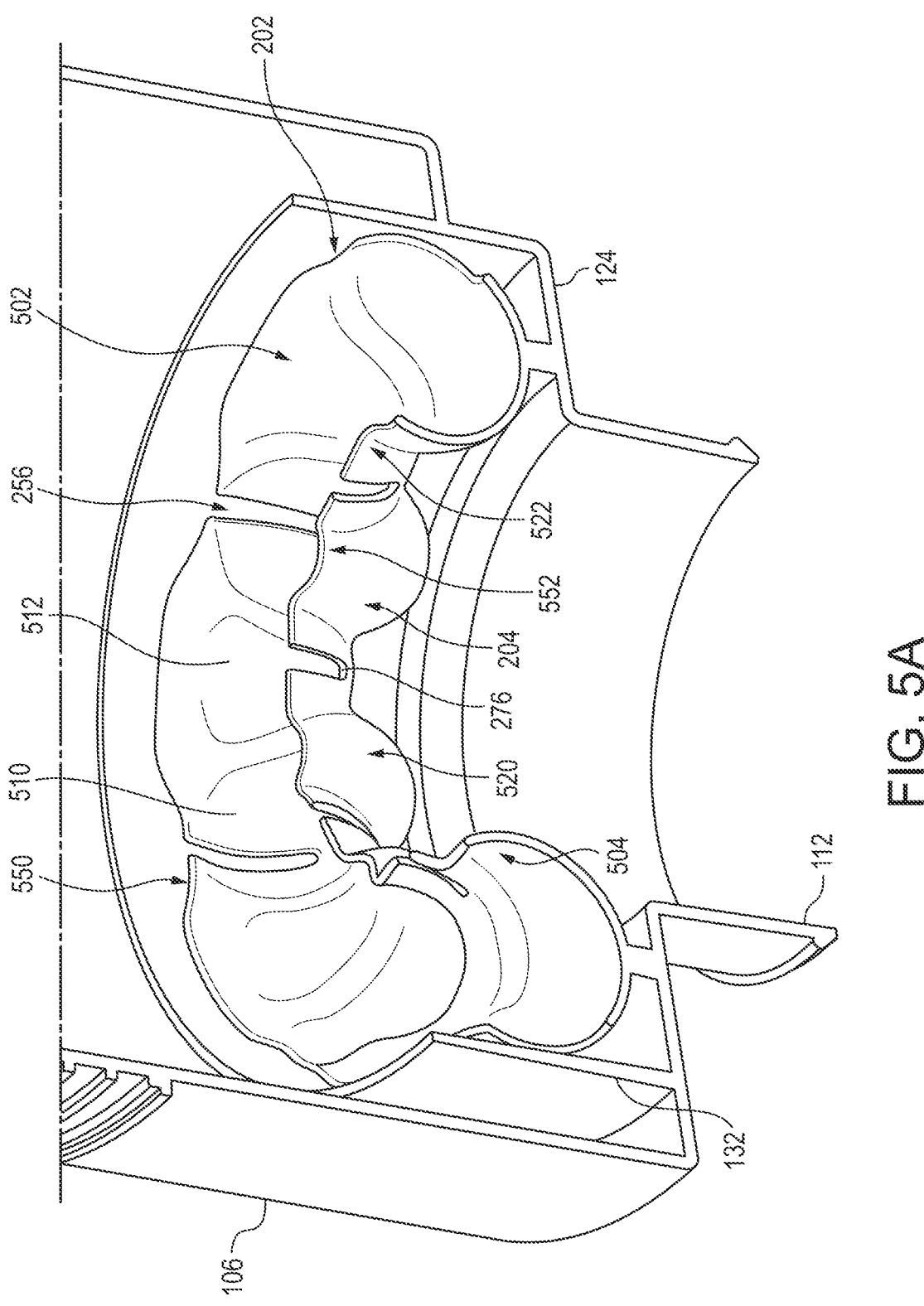
FIG. 5A is a cross-sectional perspective view of the seal ring of the housing that is complementary to the seal member of the first filter element of FIG. 3A and the seal member of the second filter element of FIG. 4A.
Figure 5B:
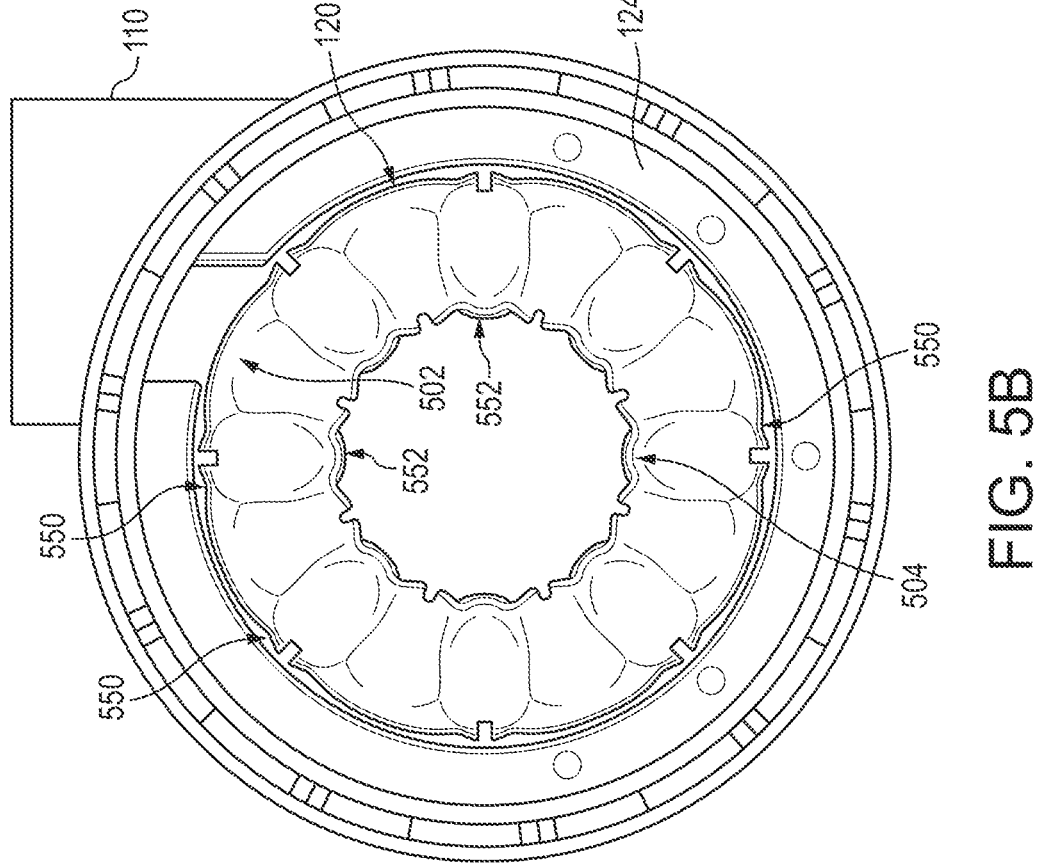
FIG. 5B is a top view of the seal ring of FIG. 5A.

As shown in FIGS. 2, 5A, & 5B, the seal ring 120 includes an internal ring portion 204 and an external ring portion 202. Generally, an internal surface 502 of the external ring portion 202 is in contact with and forms a seal with the first seal member 144 of the first filter element 102, and an internal surface 504 of the internal ring portion 204 is in contact with and forms a seal with the second seal member 164 of the second filter element 104. In other words, the internal surface 502 of the external ring portion 202 and the internal surface 504 of the internal ring portion 204 define a ring channel configured to receive the filter seal member(s). The external ring portion 202 includes a first plurality of lobe cavities 510 and a second plurality of lobe cavities 512. Each lobe cavity in the first plurality of lobe cavities 510 and each lobe cavity in the second plurality of lobe cavities 512 extends radially outward, away from the internal ring portion 204 and central axis 190. In some embodiments, the first plurality of lobe cavities 510 exhibit rotational symmetry. For example, as shown in FIG. 5A, the external ring portion 202 includes eight (8) lobe cavities positioned substantially equidistant from one another circumferentially about the seal ring 120. Accordingly, the seal ring 120 exhibits rotational symmetry of approximately 45 rotational degrees. In some embodiments, the first plurality of lobe cavities 510 include two lobe cavities positioned 180 rotational degrees apart. Thus, the seal ring 120 exhibits rotational symmetry of approximately 180. In other embodiments, the seal ring 120 exhibits rotational symmetry of equal to or less than 180 rotational degrees. Each lobe cavity in the first plurality of lobe cavities 510 is shaped to receive a complementary lobe in a first plurality of lobes 310 of the first seal member 144 of the first filter element 102. Additionally, each lobe cavity in the second plurality of lobe cavities 512 is shaped to receive a complementary lobe in a second plurality of lobes 312 of the first seal member 144 of the first filter element 102. Each lobe cavity in the second plurality of lobe cavities 512 is positioned between a pair of lobe cavities in the first plurality of lobe cavities 510 and has a similar shape to the bulbous lobe in the first plurality of lobes 310. Each lobe cavity in the first plurality of lobe cavities 510 includes a pocket 256 to receive a tab in a plurality of tabs 156 positioned along the first portion 302 of the first seal member 144. As shown in FIGS. 5A and 5B, each lobe cavity in the first plurality of lobe cavities 510 includes an external undercut portion 550.

The internal ring portion 204 includes a first plurality of lobe cavities 520 and a second plurality of lobe cavities 522. Each lobe cavity in the first plurality of lobe cavities 520 and each lobe cavity in the second plurality of lobe cavities 522 extends radially inward, away from the external ring portion 202 and toward the central axis 190. In some embodiments, the first plurality of lobe cavities 520 exhibit rotational symmetry. For example, as shown in FIG. 5A, the internal ring portion 204 includes eight (8) lobe cavities positioned substantially equidistant from one another circumferentially about the seal ring 120. Accordingly, the seal ring 120 exhibits rotational symmetry of approximately 45 rotational degrees. Each lobe cavity in the first plurality of lobe cavities 520 is opposite of the first plurality of lobe cavities 510 of the external ring portion 202. Each lobe cavity in the second plurality of lobe cavities 522 is opposite of the second plurality of lobe cavities 512 of the external ring portion 202. As discussed in greater detail below, each lobe cavity in the first plurality of lobe cavities 520 is shaped to receive a complementary lobe in a first plurality of lobes 410 of the second seal member 164 of the second filter element 104. Additionally, each lobe cavity in the second plurality of lobe cavities 522 is shaped to receive a complementary lobe in a second plurality of lobes 412 of the second seal member 164 of the second filter element 104. Each lobe cavity in the second plurality of lobe cavities 522 is positioned between a pair of lobe cavities in the first plurality of lobe cavities 520 and has a similar shape to the bulbous lobe in the first plurality of lobes 410. Each lobe cavity in the second plurality of lobe cavities 522 includes a pocket 276 to receive a tab in a plurality of tabs 176 positioned along the second portion 404 of the second seal member 164. As shown in FIGS. 5A and 5B, each lobe cavity in the first plurality of lobe cavities 520 includes an internal undercut portion 552.

Figure 3B:
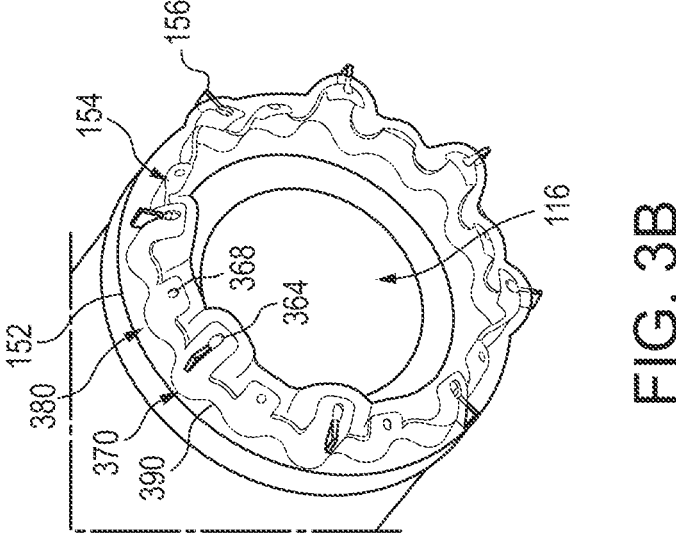
FIG. 3B is a perspective view of a first support member and the first filter element of FIG. 3A.
Figure 3A:
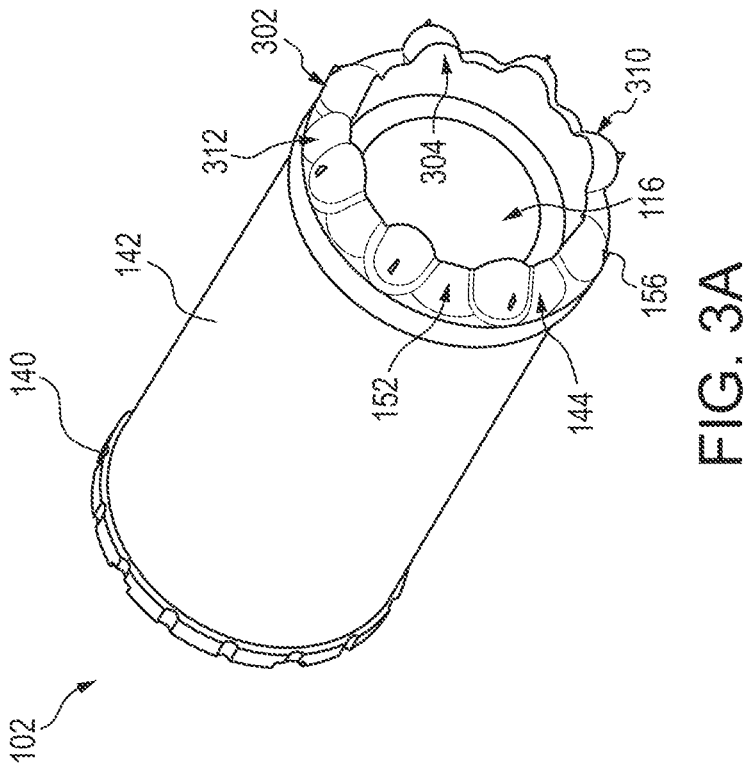
FIG. 3A is a perspective view of the first filter element with the seal member of the filtration system of FIG. 1.

Referring to FIG. 3A, the first filter element 102 includes a first filter end that includes the first endplate 140 and a second filter end that includes the first seal member 144. The first endplate 140 is disposed axially away from the first seal member 144. While the first endplate 140 is shown in FIG. 3A as a closed endplate and the first seal member 144 is at an open filter end, the first endplate 140 may be an open endplate and the first seal member 144 may be at a closed filter end, or the first endplate 140 may be an open endplate and the first seal member 144 may be located at an open filter end. The first filter element 102 includes filter media 142 disposed between the first endplate 140 and the first seal member 144. The internal portion of the filter media 142 defines a first filter cavity 116 that receives the second filter element 104.

In one set of embodiments, the first filter media 142 is generally formed by a flat sheet of first filter media 142 and a formed sheet of first filter media 142. The formed sheet includes a plurality of crests formed by a curves and/or pleats in the sheet. The plurality of crests form tetrahedron channels between the formed sheet and the flat sheet. Embossments, such as dimples, are provided on the crests formed by the curves and/or pleats. The embossments help to maintain spacing between adjacent layers of the filter media (i.e., between the formed sheet and the flat sheet), thereby increasing dust holding capacity and lowering pressure drop over similarly configured filter media not having the embossments. In some arrangements, the first filter media 142 is pleated along a plurality of bend lines. The bend lines extend axially along an axial direction and include a first set of bend lines extending from the upstream inlet axially towards the downstream outlet, and a second set of bend lines extending from the downstream outlet axially towards the upstream inlet.

In some arrangements, the first filter media 142 includes a plurality of inlet tetrahedron flow channels and a plurality of outlet tetrahedron flow channels. The inlet tetrahedron flow channels merge in a central portion of the filter material, thereby allowing axial cross-flow of air between the inlet tetrahedron channels prior to the air passing through the filter media. Such an arrangement provides for additional dust loading on the upstream side of the media, which increases filter capacity. Specific arrangements of such tetrahedral filter media are further described in U.S. Pat. No. 8,397,920, the contents of which are incorporated herein by reference. In an alternate arrangement, the flow channels comprise flutes that are alternately sealed at the upstream and downstream ends.

The first filter element 102 may be substantially rigid such that the shape of the first filter element 102 is substantially maintained during installation and use. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying with a stiffening agent, such as BASF® Elastocast 55090, polyurethane, or the like, etc.).

The first seal member 144 is configured to align with and seal against the internal surface 502 of the external ring portion 202. As shown in FIG. 2, the first seal member 144 is formed with a first seal material 152 and includes a first support member 154 centrally disposed internal of the first seal material 152. The support member may be continuous (e.g., ring-shaped/circular, square, etc.) or discontinuous (e.g., discrete sections of a support member, etc.). The support member is formed of a support material, such as a hard plastic, wood, metal, or similar material. In some embodiments, the first seal material 152 is a soft polyurethane or similar material. In other embodiments, the first seal material 152 is a hard urethane or a combination of soft and hard urethane. In some embodiments, the support material is more rigid than the first seal material 152. For example, the first seal material 152 may be a soft and compliant material and the support material may be hard plastic.

The first seal member 144 includes a first portion 302 (e.g., externally facing) and a second portion 304 (e.g., internally facing). The second portion 304 is adjacent to and facing the first filter cavity 116 and is substantially smooth. The surface of the second portion 304 is configured to be complementary to a surface of a first portion 402 of the second seal member 164 when the second filter element 104 is disposed within the first filter cavity 116 of the first filter element 102. In some embodiments, the surface of the second portion 304 and the surface of a first portion 402 are configured to contact so as to provide an additional sealing zone and impede contaminates from bypassing the first filter element 102. In other embodiments, the surface of the second portion 304 and the surface of a first portion 402 do not contact each other. In some embodiments, the second portion 304 includes one or more lobes, uneven surfaces—similar to the filter element 902 of FIGS. 10A-10C—and/or similar camming features. In some embodiments, and as shown in the filter element 802 of FIGS. 9A and 9B, both the internal portion and external portion of the seal member include at least one lobed alignment feature.

The first portion 302 of the first seal member 144 includes a first plurality of lobes 310 and a second plurality of lobes 312. As shown in FIG. 3A, each lobe in the first plurality of lobes 310 and each lobe in the second plurality of lobes 312 extends radially outward, away from the second portion 304 and central axis 190. Each lobe in the first plurality of lobes 310 and each lobe in the second plurality of lobes 312 extend radially outward substantially the same to form a repeating and substantially symmetrical seal surface. In other words, in some embodiments the first plurality of lobes 310 exhibit rotational symmetry. For example, as shown in FIG. 3A, the first seal member 144 includes eight (8) lobes positioned substantially equidistant from one another circumferentially about the first portion 302. Accordingly, the first seal member 144 exhibits rotational symmetry of approximately 45 rotational degrees. In other embodiments, the first plurality of lobes 310 includes two lobes positioned 180 rotational degrees apart. Thus, the first seal member 144 exhibits rotational symmetry of approximately 180 rotational degrees. In still other embodiments, the first seal member 144 exhibits rotational symmetry of equal to or less than 180 rotational degrees. Each lobe in the first plurality of lobes 310 has a substantially bulbous shape. Each lobe in the second plurality of lobes 312 is positioned between a pair of lobes in the first plurality of lobes 310 and has a similar shape to the bulbous lobe in the first plurality of lobes 310. As shown in FIG. 3A, each lobe in the second plurality of lobes 312 has a different size from the lobes in the first plurality of lobes 310. In some embodiments, the second plurality of lobes 312 may have a similar size, but different shape from the lobes in the first plurality of lobes 310. Each lobe in the first plurality of lobes 310 is shaped to be received by a complementary lobe cavity in the first plurality of lobe cavities 510 of the external ring portion 202 of the seal ring 120. Additionally, each lobe in the second plurality of lobes 312 is shaped to be received by a complementary lobe cavity in the second plurality of lobe cavities 512 of the external ring portion 202 of the seal ring 120.

As shown in FIG. 3A, each lobe in the first plurality of lobes 310 includes a tab in a plurality of tabs 156 positioned along the first portion 302 of the first seal member 144. As shown in the cross-sectional view in FIG. 2, the plurality tabs 156 are formed with and protrude from the first support member 154 that is positioned substantially centrally along the first seal member 144 (e.g., concentric with the central axis 190). As shown in FIG. 2, the plurality of external tabs 156 of the first seal member 144 of the first filter element 102 align with a complementary pocket in the plurality of external pockets 256 along the external ring portion 202 of the seal ring 120. In some embodiments, only one lobe in the first plurality of lobes 310 and/or one lobe in the second plurality of lobes 312 include a tab. In other embodiments, each lobe in the second plurality of lobes 312 includes a tab. In still other embodiments, tabs are included on lobes from both the lobe the first plurality of lobes 310 and second plurality of lobes 312.

Figure 3D:
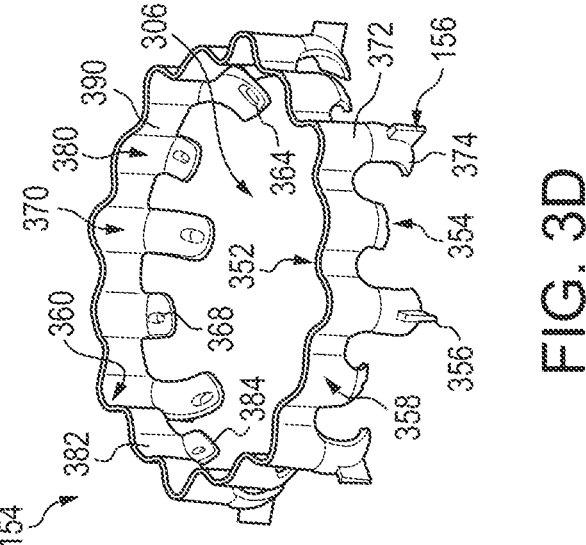
FIG. 3D is a perspective view of the first support member of FIG. 3C.
Figure 3C:
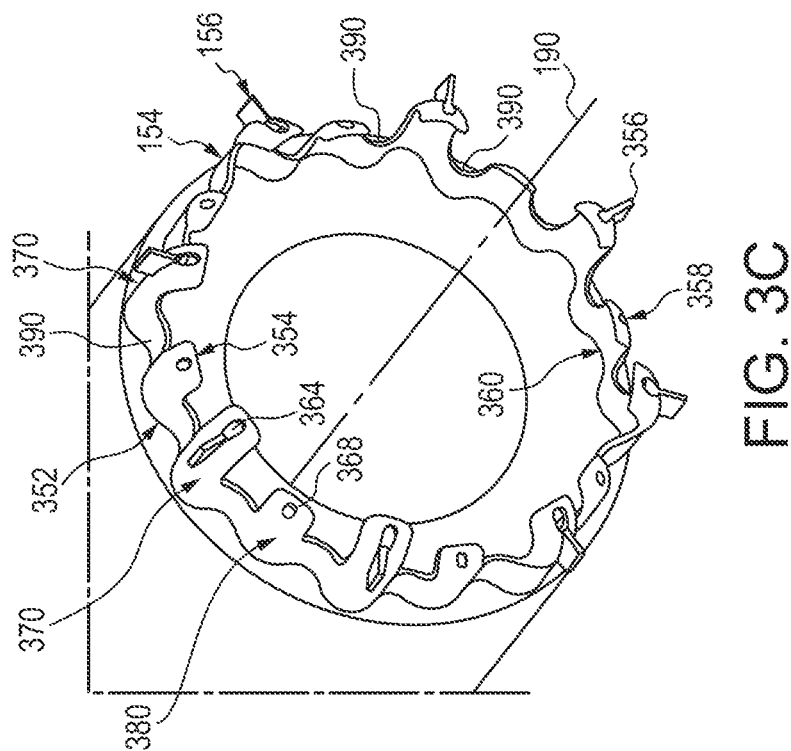
FIG. 3C is a perspective view of the first support member of the first filter element of FIG. 3A.

As shown in FIGS. 3B and 3C, the first support member 154 is integrated with the first seal member 144. The first support member 154 may be mechanically disposed within the first seal member 144 and retained on the filter to provide the plurality of tabs 156 extending radially outward (e.g., away from the central axis 190) and configured to align with and be inserted within complementary pockets 256 along the external ring portion 202 of the seal ring 120 to allow for the first filter element 102 to be properly aligned during the installation process (e.g., form a seal) within the housing 106.

As shown in FIG. 3D, the first support member 154 includes a first ring end 352, a second ring end 354, and a central ring opening 306. An internal ring surface 360 and an external ring surface 358 are disposed between the first ring end 352 and the second ring end 354. A first plurality of force distribution members 370 and a second plurality of force distribution members 380 extend from the first ring end 352 toward the second ring end 354. While the force distribution members are shown having a substantially curved, hook shape, in other embodiments, the force distribution members may be substantially flat, stair stepped, scalloped, curved, or other shaped to provide force distribution. Each force distribution member in the first plurality of force distribution members 370 and a second plurality of force distribution members 380 are configured to allow for the first seal member 144 material (e.g., urethane foam) to form through portions of the first support member 154 and retain the first support member 154 within the first seal member 144.

A plurality of curved connecting members 390 are disposed between force distribution members in the first plurality of force distribution members 370 and adjacent force distribution members in the second plurality of force distribution members 380. In other words, a force distribution member in the first plurality of force distribution members 370 is coupled to an end of a connecting member in the plurality of curved connecting members 390 and force distribution member in the second plurality of force distribution members 380 is coupled to the other end of the connecting member. Each connecting member in the plurality of curved connecting members 390 curves toward the central axis 190 as the connecting member extends between the force distribution members. In other words, the connecting member extends from the external ring surface 358 toward the internal ring surface 360 as the connecting member extends between the force distribution members.

Each force distribution member in the first plurality of force distribution members 370 has a curved portion 372 and a force distribution portion 374 (e.g., a hook portion). The curved portion 372 extends from the first ring end 352 toward the second ring end 354. The curved portion 372 curves away from the central axis 190 as the curved portion extends from a connecting member to an adjacent connecting member in the plurality of curved connecting members

390. In other words, the curved portion 372 extends from the external ring surface 358 away from the internal ring surface 360 as the curved portion 372 extends between connecting members. The force distribution portion 374 extends from the second ring end 354 away from the first ring end 352. The force distribution portion 374 extends inward toward the central axis 190 as the force distribution portion 374 extends away from the first ring end 352. A ring opening 364 is positioned on an end of the force distribution portion 374. The ring opening 364 is formed along the internal ring surface 360 and external ring surface 358 of the force distribution portion 374. The ring opening 364 is configured to allow for the first seal member 144 material (e.g., urethane foam) to form through portions of the force distribution portion 374 and retain the first support member 154 within the first seal member 144. The tab 356 in the plurality of tabs 156 is positioned above the ring opening 364 on the force distribution portion 374. The tab 356 extends from the external ring surface 358 of the force distribution portion 374 away from the internal ring surface 360.

Turning to the force distribution member in the second plurality of force distribution members 380, each force distribution member has a curved portion 382 and a force distribution portion 384. The curved portion 382 extends from the first ring end 352 toward the second ring end 354. The curved portion 382 curves away from the central axis 190 as the curved portion extends from a connecting member to an adjacent connecting member in the plurality of curved connecting members 390. In other words, the curved portion 382 extends from the external ring surface 358 away from the internal ring surface 360 as the curved portion 382 extends between connecting members. The force distribution portion 384 extends from the second ring end 354 away from the first ring end 352. The force distribution portion 384 extends inward toward the central axis 190 as the force distribution portion 384 extends away from the first ring end 352. A ring opening 368 is positioned on an end of the force distribution portion 384. The ring opening 368 is formed along the internal ring surface 360 and external ring surface 358 of the force distribution portion 384. The ring opening 368 is configured to allow for the first seal member 144 material (e.g., urethane foam) to form through portions of the force distribution portion 384 and retain the first support member 154 within the first seal member 144. As shown in FIG. 3D, the force distribution portion 384 is shorter and extends less toward the central axis 190 compared to the force distribution portion 374 of the first plurality of force distribution members 370.

Figure 4B:
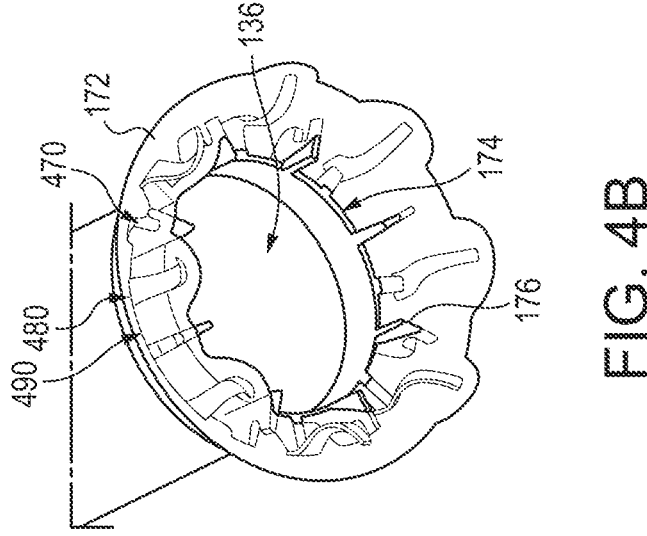
FIG. 4B is a perspective view of a second support member and the second filter element of FIG. 4A.
Figure 4A:
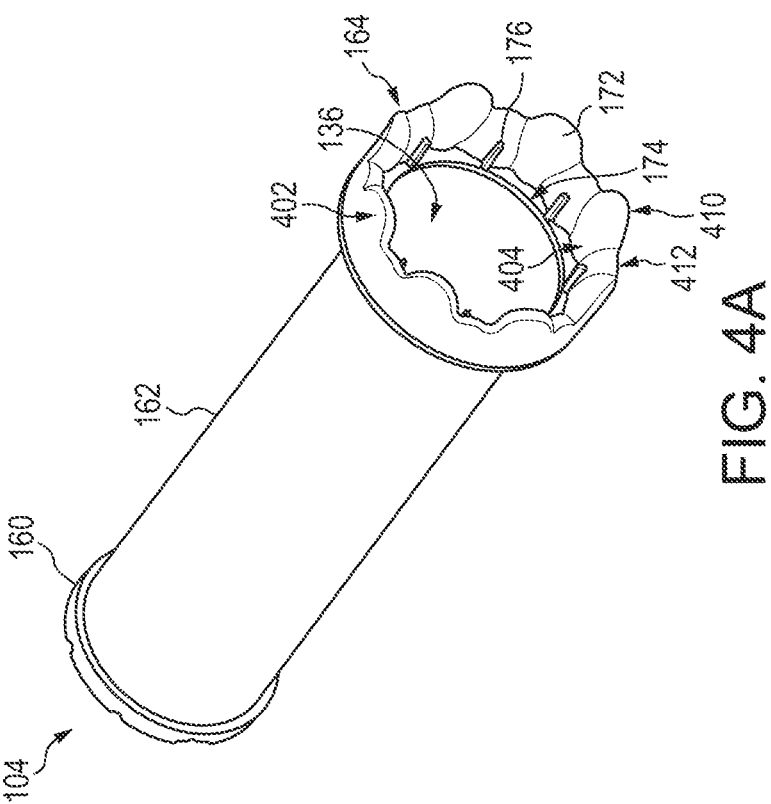
FIG. 4A is a perspective view of the second filter element with the seal member of the filtration system of FIG. 1.

Referring to FIG. 4A, the second filter element 104 includes a first filter end that includes the second endplate 160 and a second filter end that includes the second seal member 164. The second endplate 160 is disposed axially away from the second seal member 164. While the second endplate 160 is shown in FIG. 4A as a closed endplate and the second seal member 164 is at an open filter end, the second endplate 160 may be an open endplate and the second seal member 164 may be at a closed filter end, or the second endplate 160 may be an open endplate and the second seal member 164 may be at an open filter end. The second filter element 104 includes filter media 162 disposed between the second endplate 160 and the second seal member 164. The internal portion of the filter media 162 defines a second filter cavity 136.

In one set of embodiments, the second filter media 162 is generally formed by a flat sheet of second filter media 162 and a formed sheet of second filter media 162. The formed sheet includes a plurality of crests formed by a curves and/or pleats in the sheet. The plurality of crests form tetrahedron channels between the formed sheet and the flat sheet. Embossments, such as dimples, are provided on the crests formed by the curves and/or pleats. The embossments help to maintain spacing between adjacent layers of the filter media (i.e., between the formed sheet and the flat sheet), thereby increasing dust holding capacity and lowering pressure drop over similarly configured filter media not having the embossments. In some arrangements, the second filter media 162 is pleated along a plurality of bend lines. The bend lines extend axially along an axial direction and include a first set of bend lines extending from the upstream inlet axially towards the downstream outlet, and a second set of bend lines extending from the downstream outlet axially towards the upstream inlet.

In some arrangements, the second filter media 162 includes a plurality of inlet tetrahedron flow channels and a plurality of outlet tetrahedron flow channels. The inlet tetrahedron flow channels merge in a central portion of the filter material, thereby allowing axial cross-flow of air between the inlet tetrahedron channels prior to the air passing through the filter media. Such an arrangement provides for additional dust loading on the upstream side of the media, which increases filter capacity. Specific arrangements of such tetrahedral filter media are further described in U.S. Pat. No. 8,397,920. In an alternate arrangement, the flow channels comprise flutes that are alternately sealed at the upstream and downstream ends.

The second filter element 104 may be substantially rigid such that the shape of the second filter element 104 is substantially maintained during installation and use. The rigidity may be achieved through the use of a frame (e.g., a hard urethane frame, an injection molded frame, a thermo-formed frame, a roto-molded frame, a 3D printed frame, a stamped metal frame, etc.) or stiffening members (e.g., pleating stabilization beads, spraying with a stiffening agent, such as BASF® Elastocast 55090, polyurethane, or the like, etc.).

The second seal member 164 is configured to align with and seal against the internal surface 504 of the internal ring portion 204. As shown in FIG. 2, the second seal member 164 is formed with a second seal material 172 and includes a second support member 174 centrally disposed internal of the second seal material 172. In some embodiments, the second seal material 172 is a soft polyurethane or similar material. In other embodiments, the second seal material 172 is a hard urethane or a combination of soft and hard urethane. The second seal member 164 includes a first portion 402 (e.g., externally facing) and a second portion 404 (e.g., internally facing). The first portion 402 is facing away from the second filter cavity 136 and is substantially smooth. The surface of the first portion 402 is configured to be complementary to a surface of a second portion 304 of the first seal member 144 when the second filter element 104 is disposed within the first filter cavity 116 of the first filter element 102. In some embodiments, the surface of the second portion 304 and the surface of a first portion 402 are configured to contact each other to provide an additional sealing zone and impede contaminates from bypassing the first filter element 102. In other embodiments, the surface of the second portion 304 and the surface of a first portion 402 do not contact each other. In some embodiments, the first portion 402 includes one or more lobes, uneven surfaces—similar to the filter element 902 of FIGS. 10A-10C—and/or similar camming features.

The second portion 404 of the second seal member 164 is adjacent to and facing the second filter cavity 136. The second portion 404 includes a first plurality of lobes 410 and a second plurality of lobes 412. As shown in FIG. 4A, each lobe in the first plurality of lobes 410 and each lobe in the second plurality of lobes 412 extends radially inward from the first portion 402 toward the central axis 190. Each lobe in the first plurality of lobes 410 and each lobe in the second plurality of lobes 412 extend radially inward substantially the same to form a repeating and substantially symmetrical seal surface. In other words, in some embodiments the first plurality of lobes 410 exhibit rotational symmetry. For example, as shown in FIG. 4A, the second seal member 164 includes eight (8) lobes positioned substantially equidistant from one another circumferentially about the second portion 404. Accordingly, the second seal member 164 exhibits rotational symmetry of approximately 45 rotational degrees. Each lobe in the first plurality of lobes 410 has a substantially bulbous shape. Each lobe in the second plurality of lobes 412 is positioned between a pair of lobes in the first plurality of lobes 410 and has a similar shape to the bulbous lobe in the first plurality of lobes 410. As shown in FIG. 4A, each lobe in the second plurality of lobes 412 has a different size from the lobes in the first plurality of lobes 410. In some embodiments, the second plurality of lobes 412 may have a similar size, but different shape from the lobes in the first plurality of lobes 410. Each lobe in the first plurality of lobes 410 is shaped to be received by a complementary lobe cavity in the first plurality of lobe cavities 520 of the internal ring portion 204 of the seal ring 120. Additionally, each lobe in the second plurality of lobes 412 is shaped to be received by a complementary lobe cavity in the second plurality of lobe cavities 522 of the internal ring portion 204 of the seal ring 120.

As shown in FIG. 4A, each lobe in the second plurality of lobes 412 includes a tab in a plurality of tabs 176 positioned along the second portion 404 of the second seal member 164. In some embodiments, only one lobe in the first plurality of lobes 410 and/or one lobe in the second plurality of lobes 412 include a tab. In some embodiments, each lobe in the second plurality of lobes 412 includes a tab. In other embodiments, tabs are included on lobes from both the lobe the first plurality of lobes 410 and second plurality of lobes 412. As shown in the cross-sectional view in FIG. 2, the plurality tabs 176 are formed with and protrude from the second support member 174 that is positioned substantially centrally along the second seal member 164 (e.g., concentric with the central axis 190). In some embodiments, one or more tabs may be non-centrally located within or in relation to the tabs. Beneficially, the plurality of tabs 156 on the first seal member 144 and the plurality of tabs 176 on the second seal member 164 force a user installing the first filter element 102 and the second filter element 104, respectively, to rotate the filter elements until the tabs line up with and enter the respective pockets on the external ring portion 202 and internal ring portion 204 of the seal ring 120. When the first filter element 102 and the second filter element 104 are aligned with and secured within in the seal ring 120 of the filter housing 106, the undercuts (for example, the undercut 630 of FIG. 7C) of the filter seal lock the filter elements and secure the filter elements in place under severe vibration.

Figure 4D:
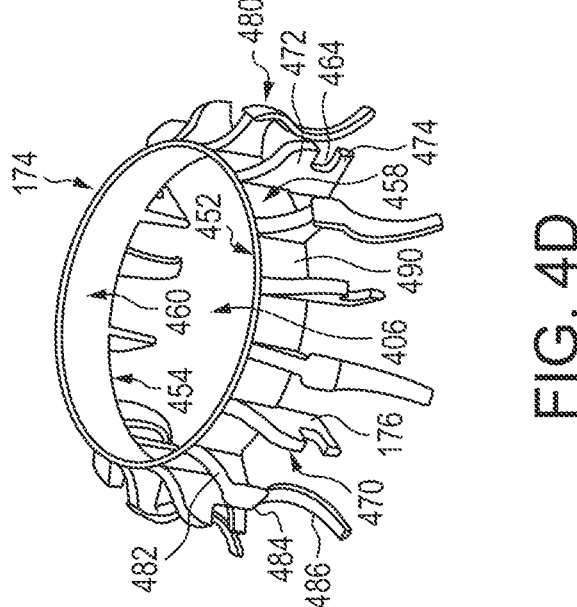
FIG. 4D is a perspective view of the second support member of FIG. 4C.
Figure 4C:
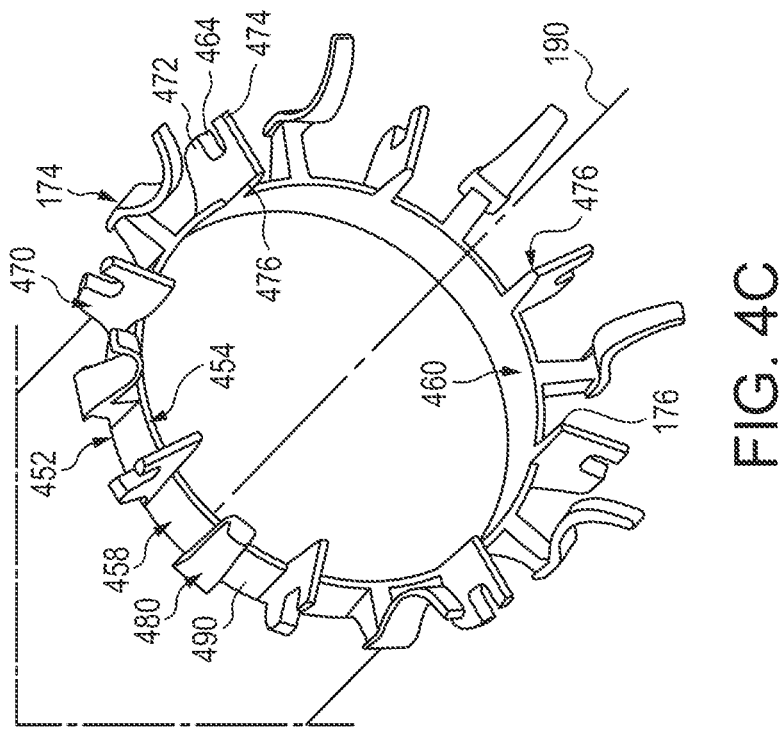
FIG. 4C is a perspective view of the second support member of the second filter element of FIG. 4A.

As shown in FIGS. 4B and 4C, the second support member 174 is integrated with the second seal member 164. The second support member 174 may be mechanically disposed within the second seal member 164 and retained on the filter to provide the plurality of tabs 176 extending radially outward (e.g., away from the central axis 190) and configured to align with and be inserted within complementary pockets 276 along the internal ring portion 204 of the seal ring 120 to allow for the second filter element 104 to be properly aligned during the installation process (e.g., form a seal) within the housing 106 and the first filter element 102.

As shown in FIG. 4D, the second support member 174 includes a first ring end 452, a second ring end 454, and a central ring opening 406. An internal ring surface 460 and an external ring surface 458 are disposed between the first ring end 452 and the second ring end 454. A first plurality of force distribution members 470 and a second plurality of force distribution members 480 extend from the first ring end 452 toward the second ring end 454. Each force distribution member in the first plurality of force distribution members 470 and a second plurality of force distribution members 480 are configured to allow for the second seal member 164 material (e.g., urethane foam) to form through portions of the second support member 174 and retain the second support member 174 within the second seal member 164.

A plurality of connecting members 490 are disposed between force distribution members in the first plurality of force distribution members 470 and adjacent force distribution members in the second plurality of force distribution members 480. In other words, a force distribution member in the first plurality of force distribution members 470 is coupled to an end of a connecting member in the plurality of connecting members 490, and force distribution member in the second plurality of force distribution members 480 is coupled to the other end of the connecting member. As shown in FIGS. 4C and 4D, the connecting members in the plurality of connecting members 490 substantially smooth on the internal surface and the external surface.

Each force distribution member in the first plurality of force distribution members 470 has a upper portion 472 and a lower portion 474. An opening 464 is positioned between the upper portion 472 and the lower portion 474. The upper portion 472 extends from the first ring end 452 toward the second ring end 454 and extends away from the central axis 190 as the portion extends away from the first ring end 452. The upper portion 472 curves in a crescent manner away from the central axis 190 as the curved portion extends toward the second ring end 454. The lower portion 474 extends from the upper portion 472 away from the central axis 190 as the portion extends away from the first ring end 452. The opening 464 is positioned on an end of the upper portion 472 and an end of the lower portion 474 away from the central axis 190. The opening 464 is configured to allow for the second seal member 164 material (e.g., urethane foam) to form through portions of the lower portion 474 and retain the second support member 174 within the second seal member 164. The tab 476 in the plurality of tabs 176 is positioned opposite of the lower portion 474 (e.g., radially inward toward the central axis 190). The tab 476 extends from the lower portion 474 toward the central axis 190 and past the internal ring surface 460.

Each force distribution member in the second plurality of force distribution members 480 has a radial portion 482, an axial portion 484, and a curved portion 486. The radial portion 482 extends from the external ring surface 458 radially away from the internal ring surface 460. The axial portion 484 extends from the end of the radial portion 482 axially toward the second ring end 454. The curved portion 486 extends from an end of the axial portion 484 away from the first ring end 452. The curved portion 486 curves away from the central axis 190 as the curved portion extends from the axial portion 484. In other words, the curved portion 486 extends from axial portion 484 away from the internal ring surface 460 as the curved portion 486 extends away from the axial portion 484. The curved portion 486 may be configured to allow for the second seal member 164 material (e.g., urethane foam) to form through portions of the force distribution portion 484 and retain the second support member 174 within the second seal member 164. As shown in FIG. 4D, the force distribution member in the first plurality of force distribution members 470 is shorter and extends less away from the central axis 190 compared to the force distribution member in the second plurality of force distribution members 480.

Figures 6A, 6B:
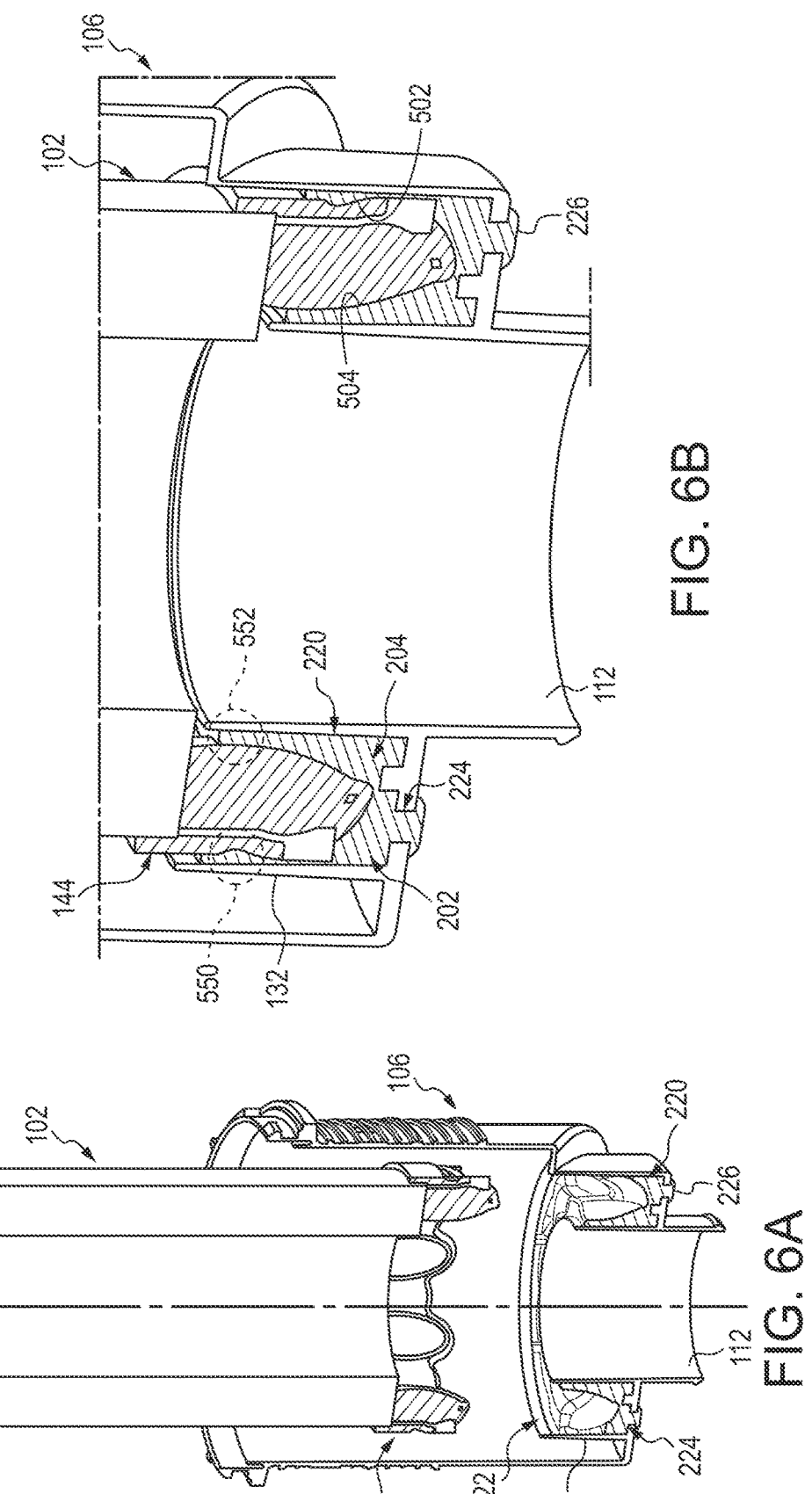
FIG. 6A is an exploded cross-sectional perspective view of a filtration system having a filter element with a seal member and a filter housing with a seal ring, according to an example embodiment.
FIG. 6B is a cross-sectional perspective view of a portion of the filtration system of FIG. 6A.

Turning to FIGS. 6A-6B, a seal ring 220 is shown according to an example embodiment. The seal ring 220 is similar to the seal ring 120. Accordingly, like numbering is used to denote like parts. A difference between the seal ring 220 and the seal ring 120 is that the seal ring 220 is formed of a curing material (e.g., solidifying material, cross-linking material, vulcanizing material, etc.) such as urethane, epoxy, silicone, rubber, and the like. The curing material is disposed within the filter housing 106 and is cured in the filter housing 106. The seal ring 220 is configured to engage a seal member, such as the first seal member 144, and form a substantially watertight sealing engagement. The seal ring 220 is positioned within an annular cavity 222 cooperatively formed by the filter outlet 112, the bottom filter guidance member 132, and the second housing end 124. As shown, a portion of the filter outlet 112 may extend axially toward the first housing end 122 at approximately the same height (e.g., distance from the second housing end 124) as the bottom filter guidance member 132. The curing material is disposed within the annular cavity 222 and is configured to chemically bond to the filter housing 106, which couples the seal ring 220 to the annular cavity.

In some embodiments, the annular cavity 222 defines a plurality of orifices 224 extending through second housing end 124 such that a portion of the seal ring 220, shown as an interlocking ring portion 226, extends through the plurality of orifices 224. The interlocking ring portion 226 extends through one of the plurality of orifices 224 and defines a head portion at the second housing end 124 outside of the annular cavity 222. The interlocking ring portion 226 and the head portion form a mechanical connection with the filter housing 106 to prevent the seal ring 220 from being pulled out of the filter housing 106 when a filter element (e.g., the first filter element 102, the second filter element 104, the filter element 802, etc.) is removed from the filter housing 106. In other words, the seal ring 220 is overmolded with the filter housing 106.

The seal ring 220 includes an internal ring portion 204 and an external ring portion 202. An internal surface 502 of the external ring portion 202 is in contact with and forms a seal with a seal member of a filter element positioned within the filter housing 106. Similarly, an internal surface 504 of the internal ring portion 204 is in contact with and forms a seal with the seal member of the filter element. In some embodiments, the filter element includes the first filter element 102 and the second filter element 104. Specifically, the first seal member 144 of the first filter element 102 engages the internal surface 502 and the second seal member 164 of the second filter element 104 engages the internal surface 504.

The external ring portion 202 includes a first plurality of lobe cavities 510 and a second plurality of lobe cavities 512. Each lobe cavity in the first plurality of lobe cavities 510 and each lobe in the second plurality of lobe cavities 512 extends radially outward, away from the internal ring portion 204 and central axis 190. Each lobe cavity in the first plurality of lobe cavities 510 is shaped to receive a complementary lobe in a first plurality of lobes 310 of the first seal member 144 of the first filter element 102. Additionally, each lobe cavity in the second plurality of lobe cavities 512 is shaped to receive a complementary lobe in a second plurality of lobes 312 of the first seal member 144 of the first filter element 102. Each lobe in the second plurality of lobe cavities 512 is positioned between a pair of lobe cavities in the first plurality of lobe cavities 510 and has a similar shape to the bulbous lobe in the first plurality of lobes 310.

In some embodiments, each lobe cavity in the first plurality of lobe cavities 510 includes a pocket 256 to receive a tab in a plurality of tabs 156 positioned along the first portion 302 of the first seal member 144. As shown in FIGS. 6A and 6B, each lobe cavity in the first plurality of lobe cavities 510 includes an external undercut portion 550.

The internal ring portion 204 includes a first plurality of lobe cavities 520 and a second plurality of lobe cavities 522. Each lobe cavity in the first plurality of lobe cavities 520 and each lobe cavity in the second plurality of lobe cavities 522 extends radially outward, away from the external ring portion 202 and toward the central axis 190. In some embodiments, each lobe cavity in the first plurality of lobe cavities 520 is positioned opposite to the first plurality of lobe cavities 510 of the external ring portion 202. In some embodiments, each lobe cavity in the second plurality of lobe cavities 522 is opposite of the second plurality of lobe cavities 512 of the external ring portion 202. Each lobe cavity in the first plurality of lobe cavities 520 and the second plurality of lobe cavities 522 is shaped to receive a complementary lobe of the seal member (e.g., the second seal member 164). Each lobe cavity in the second plurality of lobe cavities 522 includes a pocket 276 to receive a tab in a plurality of tabs 176 positioned along the seal member. As shown in FIGS. 6A and 6B, each lobe cavity in the first plurality of lobe cavities 520 includes an internal undercut portion 552.

To form the seal ring 220, an uncured (e.g., not yet cured, the curing material outlined above, etc.) material, such as urethane or a two-part epoxy, is positioned within the annular cavity 222. Next, a mold having the same shape as the seal member (e.g., the first seal member 144, the second seal member 164, etc.) is inserted into the filter housing 106 and into the annular cavity 222 to make an impression within the uncured material. Once the uncured material has cured, the mold is removed from the annular cavity 222 and the seal ring 220 is complete. In some embodiments, the uncured material is squeezed out of the plurality of orifices 224 during the impression step, effectively overmolding the seal ring 220 with the filter housing 106 via the interlocking ring portion 226. In some embodiments, the uncured material, once cured, forms a chemical bond (e.g., crosslinks) with the surfaces defining the annular cavity 222. The mechanical coupling formed by the interlocking ring portion 226 cooperates with the chemical bond between the seal ring 220 and the filter housing 106 to prevent movement of the seal ring 220 axially along the central axis 190 relative to the filter housing 106. Once the uncured material has cured, the mold may be removed from the annular cavity 222 and the filter housing 106. In some embodiments, the uncured material is stiff, rigid and not compliant, such as a hard urethane, hard plastic, cured epoxy, and the like. Thus, when the mold is removed, the mold is flexed in order to pass by the undercuts 550, 552 (e.g., negative draft angles). In some embodiments, the uncured material is a soft, compressible material, such as rubber, silicone, foamed urethane, and the like that exhibits enough compliance where a rigid mold may be used and removed from the seal ring 220 without being flexed and without damaging the seal ring 220.

In some embodiments, the seal ring 220 is formed without negative draft angles. In other words, the seal ring 220 may be formed without the external undercut portion 550 and the internal undercut portion 552. For example, the seal member positioned within the seal ring 220 may include edges that taper toward a smaller cross-sectional area as the seal member extends away from the filter element.

Figure 7B:
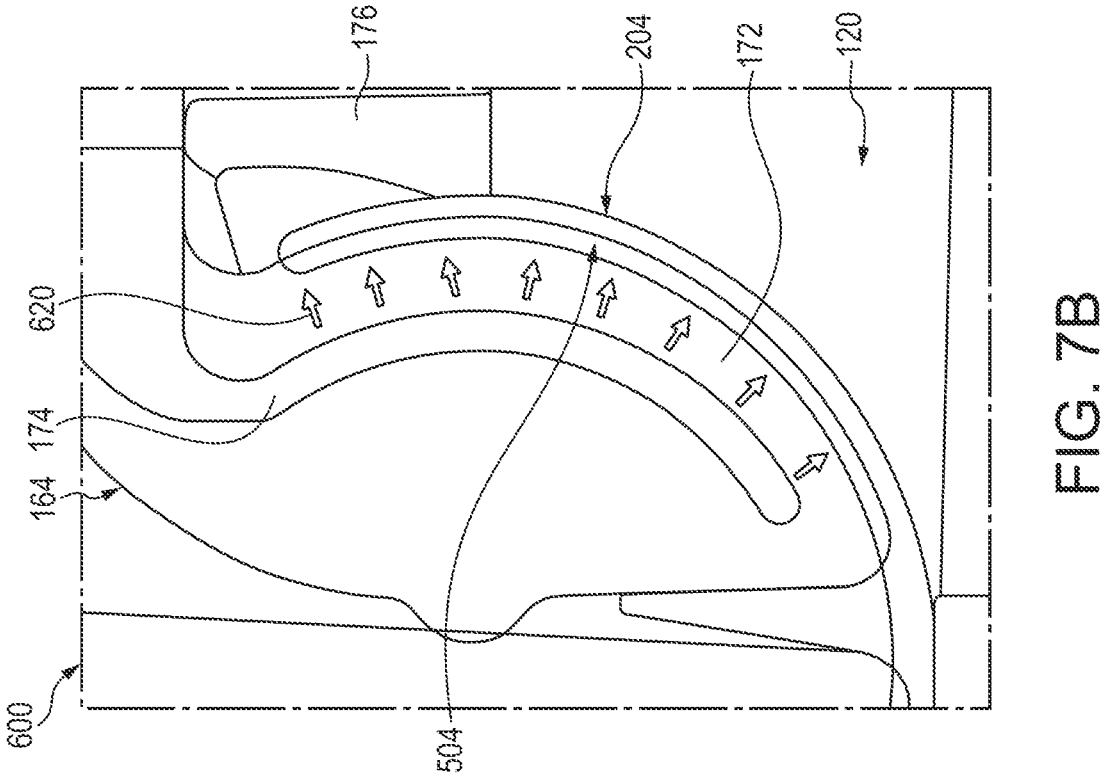
FIG. 7B is a cross-sectional side view of a distributed compressive force in a portion of the seal member of the second filter element and the seal ring of the filtration system of FIG. 1.
Figure 7A:
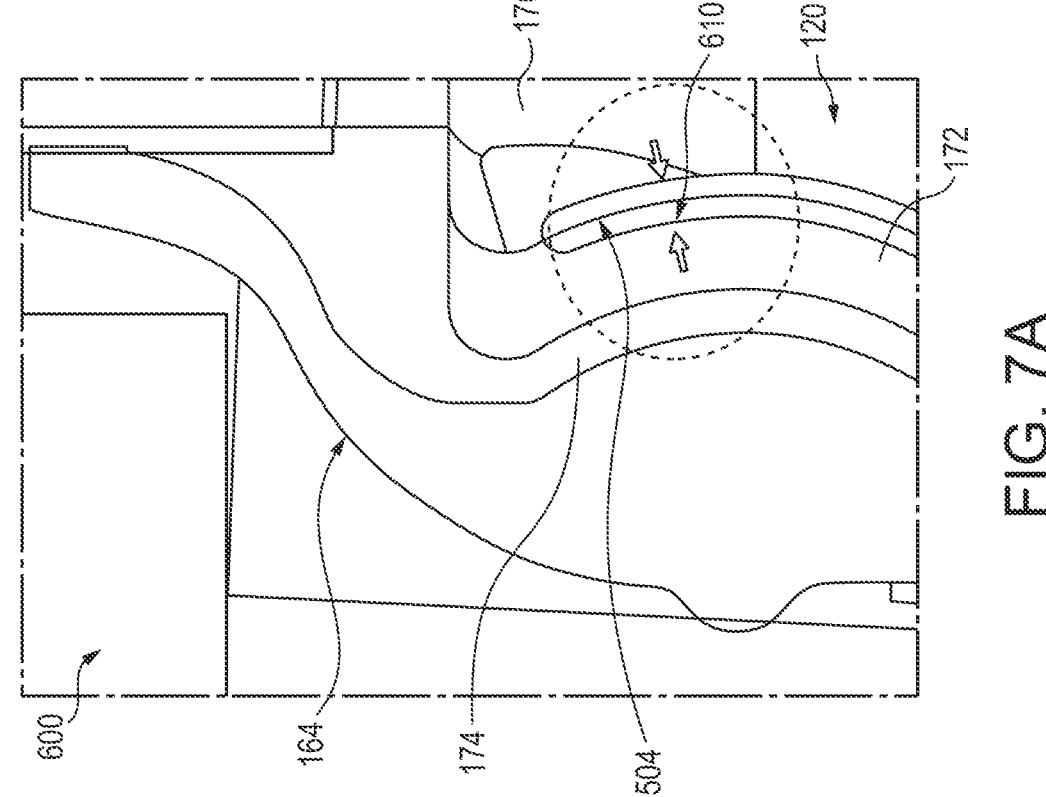
FIG. 7A is a cross-sectional side view of a portion of the seal member of the second filter element and the seal ring of the filtration system of FIG. 1.
Figure 8:
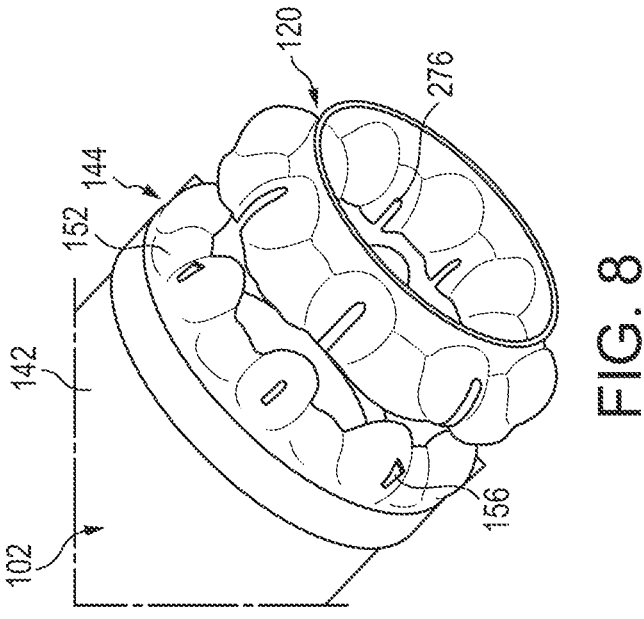
FIG. 8 is a perspective view of the alignment of the seal ring and the seal member of the first filter element of the filtration system of FIG. 1.

Turning to FIG. 7A, a cross-sectional side view of a portion 600 of the second seal member 164 of the second filter element 104 and the seal ring 120 of the filtration system 100 of FIG. 1. The compressible and displaceable second seal material 172 of the second seal member 164 contacts an internal surface 504 of the internal ring portion 204 of the seal ring 120 to seal the second filter element 104 within the filter housing 106. Specifically, the space 610 between the second seal material 172 and the internal ring portion 204 of the seal ring 120 depicts the compression and displacement that creates a continuous sealing surface between the second filter element 104 and the filter housing 106. The continuous sealing surface may be either a uniform sealing force or non-uniform sealing force depending on the design of the seal ring 120 and interaction (e.g., alignment and engagement) between the seal ring and support member(s). The compression and displacement of the second seal material 172 allows continuous force of the second seal member 164 axially and radially along the internal surface 504 of the internal ring portion 204 of the seal ring 120, thereby holding the second filter element 104 firmly within the filter housing 106.

Figure 7C:
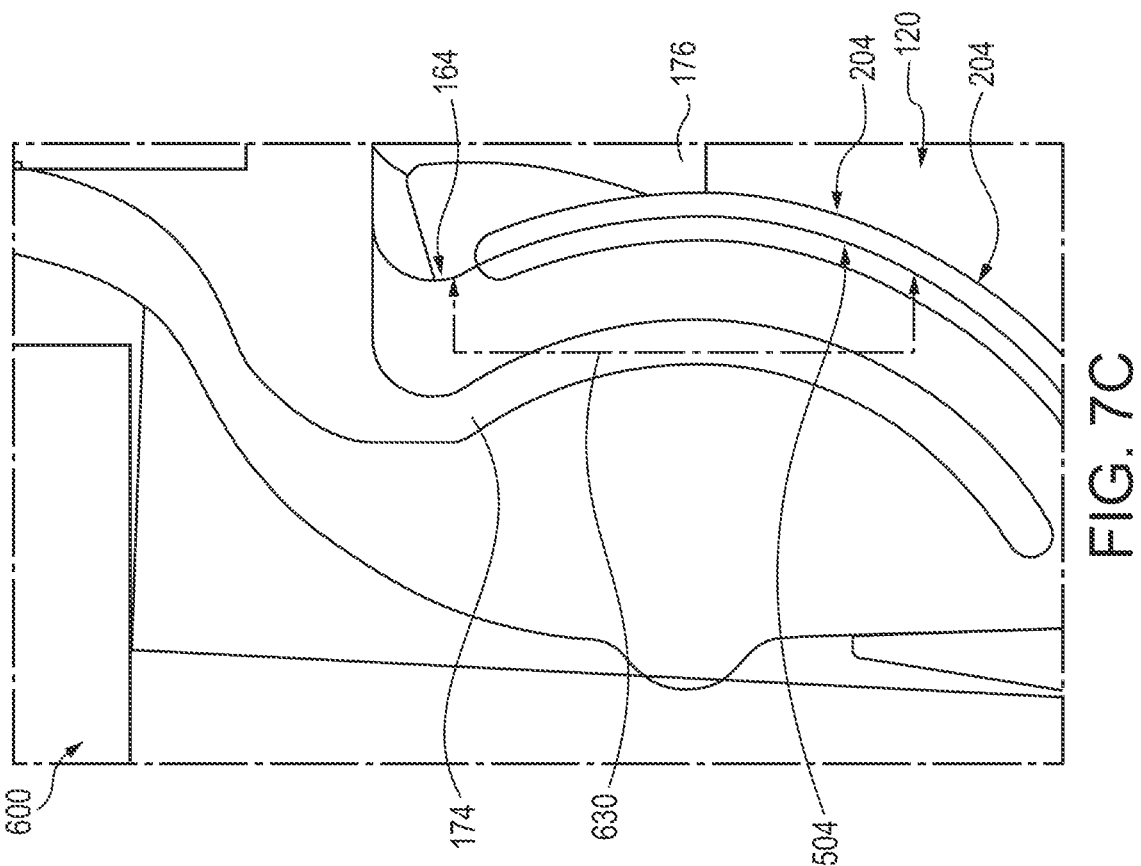
FIG. 7C is a cross-sectional side view of the undercuts of a portion of the seal member of the second filter element and the seal ring of the filtration system of FIG. 1.

As shown in FIG. 7B, the flexible reinforcement second support member 174 is configured to reinforce the "softer" compressible and displaceable second seal material 172 as it interfaces with the internal ring portion 204 of the seal ring 120. The second support member 174 distributes a force 620 normal to that of the compression and displacement surface of the second seal material 172. Beneficially, the second support member 174 is configured to mitigate seal material shrinkage, loss of seal material properties, thermoset, and other integrity deficiencies of the seal material. Turning to FIG. 7C, the undercut surface 630 of the internal undercut portion 552 are configured to mitigate filter element sag after installation of the filter element (e.g., first filter element 102 and/or second filter element 104) within the filter housing 106. The undercut surface 630 allows the filter housing 106 to—in tandem with the surface area of the second portion 404 of the second seal member 164—increases the seal alignment and engagement between the filter element(s) and the filter housing 106.

Figure 9B:
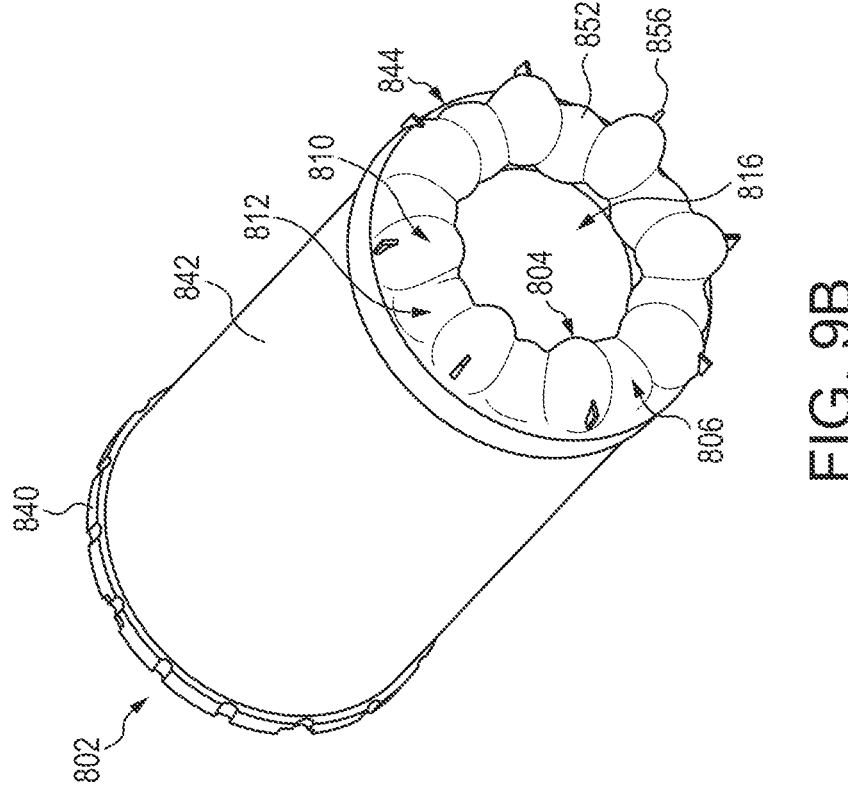
FIG. 9B is a perspective view of the filter element with the seal member of the filtration system of FIG. 9A.
Figure 9A:
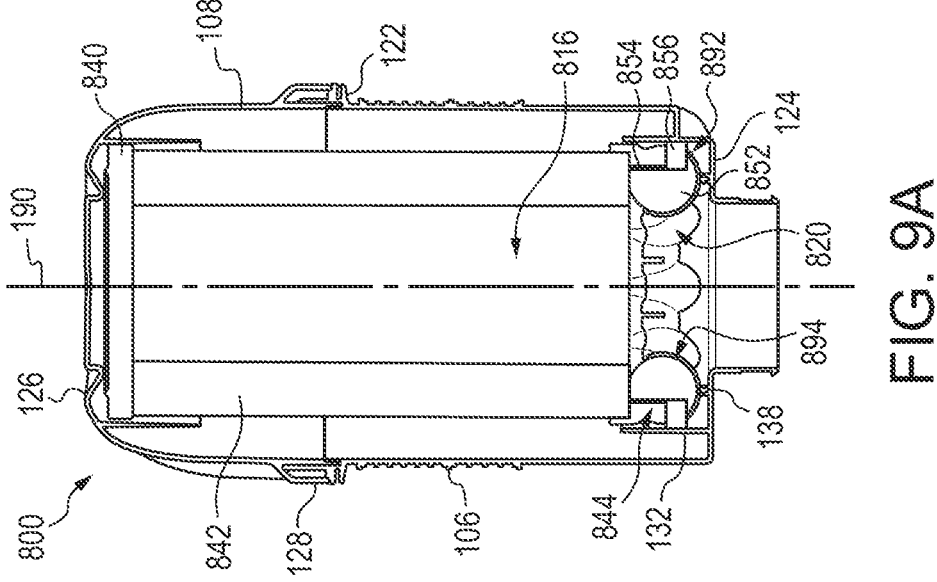
FIG. 9A is a cross-sectional side view of a filtration system having a filter element with a seal member and a seal ring, according to an example embodiment.

Turning to FIGS. 9A and 9B, views of a filtration system 800 with a single filter element 802 having a seal member 844 are shown, according to an example embodiment. The filter element 802 and seal ring 820 of the filtration system 800 are similar to the filter element 102 and seal ring 120 of FIGS. 1-8. A difference between the filtration system 800 and the filtration system 100 is the filtration system 800 includes a filter element 802 with a filter seal member 844 having lobes on the internal and external portions and only external tabs. Accordingly, like numbering is used to designate like parts between the filtration system 800 and the filtration system 100. The filtration system 800 includes a filter element 802 disposed within a filter housing 106 and filter housing cover 108. The filter element 802 is positioned centrally along a central axis 190 of the filter housing 106. The filter element 802 includes a seal member 844 that aligns with and engages a seal ring 820 along the filter housing 106. As described in greater detail below, the shape and size of the seal ring is complementary to the seal member 844 to allow for the filter element 802 to be disposed within the filter housing 106 when properly aligned.

The filter housing cover 108 includes a first cover end 126 and a second cover end 128 disposed axially away from the first cover end 126. The second cover end 128 is configured to couple with a first housing end 122 of the filter housing 106 such that the housing cover 108 is coupled to the filter housing 106. The first cover end 126 includes a top filter guidance member 130 that extends from the first cover end 126 axially toward the second cover end 128 and is configured to guide and receive an endplate 840 of the filter element 802.

The filter housing 106 includes a first housing end 122 and a second housing end 124 disposed axially away from the first housing end 122. The first housing end 122 is configured to couple the filter housing 106 to a filter housing cover 108. The second housing end 124 includes a bottom filter guidance member 132, a filter outlet 112, and a seal ring 820. The bottom filter guidance member 132 extends from the second housing end 124 axially toward the first housing end 122 and is configured to guide and receive the seal of the seal member 844 end of the filter element 802. The seal ring 820 is coupled to the second housing end 124 along a coupler ring 138. In some embodiments, the seal ring 820 is formed with the filter housing 106 such that they are one, unitary element. In other embodiments, the seal ring 820 is coupled to the filter housing 106 along the outlet ring 138.

The seal ring 820 includes an internal ring portion 894 and an external ring portion 892. Generally, an internal surface of the external ring portion 892 is in contact with and forms a seal with an external portion of a first plurality of lobes 810 and an external portion of a second plurality of lobes 812 of the seal member 844. An internal surface of the internal ring portion 894 is in contact with and forms a seal with an internal portion of a first plurality of lobes 810, and an internal surface of the external ring portion 892 is in contact with and forms a seal with an internal portion of a second plurality of lobes 812 of the seal member 844. In other words, the external ring portion 892 and the internal ring portion include a plurality of lobe cavities that are complementary in shape to the first plurality of lobes 810 and second plurality of lobes 812 of the seal member 844. The external ring portion 892 includes a plurality of pockets configured to receive complementary tabs of a plurality of tabs 856 positioned along the first portion 806 of the seal member 844. Further, each lobe cavity in the plurality of lobe cavities may include external undercut portions similar to the external undercut portion 550 of the seal ring 120 and internal undercut portions similar to the internal undercut portion 552 of the seal ring 120.

Referring to FIG. 9B, the filter element 802 includes a first filter end that includes the endplate 840 and a second filter end that includes the seal member 844. The endplate 840 is disposed axially away from the seal member 844. While the endplate 840 is shown in FIG. 9B as a closed endplate and the seal member 844 is an open filter end, the endplate 840 may be an open endplate and the seal member 844 may be a closed filter end, or the endplate 840 may be an open endplate and the seal member 844 may be an open filter end. The filter element 802 includes filter media 842 disposed between the endplate 840 and the seal member 844. The internal portion of the filter media 842 defines a first filter cavity 816.

In one set of embodiments, the filter media 842 is generally formed by a flat sheet of filter media 842 and a formed sheet of filter media 842. The formed sheet includes a plurality of crests formed by a curves and/or pleats in the sheet. The plurality of crests form tetrahedron channels between the formed sheet and the flat sheet. Embossments, such as dimples, are provided on the crests formed by the curves and/or pleats. The embossments help to maintain spacing between adjacent layers of the filter media (i.e., between the formed sheet and the flat sheet), thereby increasing dust holding capacity and lowering pressure drop over similarly configured filter media not having the embossments. In some arrangements, the filter media 842 is pleated along a plurality of bend lines. The bend lines extend axially along an axial direction and include a first set of bend lines extending from the upstream inlet axially towards the downstream outlet, and a second set of bend lines extending from the downstream outlet axially towards the upstream inlet.

In some arrangements, the filter media 842 may include a plurality of inlet tetrahedron flow channels and a plurality of outlet tetrahedron flow channels. The inlet tetrahedron flow channels merge in a central portion of the filter material, thereby allowing axial cross-flow of air between the inlet tetrahedron channels prior to the air passing through the filter media. Such an arrangement provides for additional dust loading on the upstream side of the media, which increases filter capacity. Specific arrangements of such tetrahedral filter media are further described in U.S. Pat. No. 8,397,920. In an alternate arrangement, the flow channels comprise flutes that are alternately sealed at the upstream and downstream ends.

The filter element 802 may be substantially rigid such that the shape of the filter element 802 is substantially maintained during installation and use. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying with a stiffening agent, such as BASF® Elastocast 55090, polyurethane, or the like, etc.).

As shown in FIG. 9A, the seal member 844 is formed with a seal material 852 and may include a support member 154 centrally disposed internal of the seal material 852. The seal material 852 may be a soft polyurethane or similar material. In other embodiments, the seal material 852 is a hard urethane or a combination of soft and hard urethane. The seal member 844 includes a first portion 806 (e.g., externally facing) and a second portion 804 (e.g., internally facing). The second portion 804 is adjacent to and facing the first filter cavity 816 and includes the internal portion of the inwardly protruding first plurality of lobes 810 and second plurality of lobes 812. The first portion 806 of the seal member 844 includes a first plurality of lobes 810 and a second plurality of lobes 812. As shown in FIG. 9B, each lobe in the first plurality of lobes 810 and each lobe in the second plurality of lobes 812 extend both radially outward, away from the central axis 190, and radially inward, toward the central axis 190 as the lobes are bulbous in both radial directions. Each lobe in the first plurality of lobes 810 and each lobe in the second plurality of lobes 812 extend radially outward substantially the same to form a repeating and substantially symmetrical seal surface. Each lobe in the first plurality of lobes 810 has a substantially bulbous shape. Each lobe in the second plurality of lobes 812 is positioned between a pair of lobes in the first plurality of lobes 810 and has a similar shape to the bulbous lobe in the first plurality of lobes 810. As shown in FIG. 9B, each lobe in the second plurality of lobes 812 has a different size from the lobes in the first plurality of lobes 810. In some embodiments, the second plurality of lobes 812 may have a similar size, but different shape from the lobes in the first plurality of lobes 810. Each lobe in the first plurality of lobes 810 is shaped to be received by a complementary lobe cavity in the seal ring 820. Additionally, each lobe in the second plurality of lobes 812 is shaped to be received by a complementary lobe cavity in the seal ring 820.

As shown in FIG. 9B, each lobe in the first plurality of lobes 810 includes a tab in a plurality of tabs 856 positioned along the first portion 806 of the seal member 844. As shown in the cross-sectional view in FIG. 9A, the plurality tabs 856 are formed with and protrude from the support member 854 that is positioned substantially centrally along the seal member 844 (e.g., concentric with the central axis 190). The plurality of external tabs 856 of the seal member 844 of the filter element 802 align with a complementary pocket in the plurality of external pockets along the external ring portion 892 of the seal ring 820.

Turning to FIGS. 10A-10C, views of a filter element 902 are shown, according to another example embodiment. The filter element 902 is similar to the filter element 102 of FIGS. 1-8. A difference between the filter element 902 and the filter element 102 is the filter element 902 has a lobes that are non-planar (e.g., non-symmetrical, non-repeating, etc.). In other words, the seal member 944 of the filter element 902 is irregularly patterned to form a non-planar seal with a complementary seal ring. Accordingly, like numbering is used to designate like parts between the filter element 902 and the filter element 102. The filter element 902 includes a first filter end that includes the first endplate 940 and a second filter end that includes the irregular seal member 944. The first endplate 940 is disposed axially away from the irregular seal member 944. The filter element 902 includes filter media 942 disposed between the first endplate 940 and the irregular seal member 944. The internal portion of the filter media 942 defines a filter cavity 916.

The irregular seal member 944 is configured to align with and seal against an internal surface of an external ring portion of a complementary seal ring. As shown in FIG. 10B, the irregular seal member 944 is above, along, and below a normal parallel seal plane 972. The irregular seal member 944 includes a first portion 906 (e.g., externally facing) and a second portion 904 (e.g., internally facing). The second portion 904 is adjacent to and facing the filter cavity 916 and is substantially smooth. In some embodiments, the surface of the second portion 904 is configured to be complementary to a surface of a second filter element when the second filter element is disposed within the filter cavity 916 of the filter element 902. The first portion 906 of the irregular seal member 944 includes a plurality of lobes 910 that are nonplanar. In other words, lobes in the plurality of lobes 910 extend along a lower seal plane 922, radially around the outer surface of the first portion 906 toward an upper seal plane 924 such that lobes in the plurality of lobes 910 are non-planar with other lobes in the plurality of lobes 910. While the lobes in the plurality of lobes 910 are not shown with a tab or plurality of tabs, in some embodiments, one or more lobes in the plurality of lobes 910 may include a tab. In some embodiments, the plurality of lobes 910 are positioned such that the irregular seal member 944 does not exhibit rotational symmetry. For example, as shown in FIG. 10C, the plurality of lobes 910 are not positioned equidistant from one another about a circumference of the irregular seal member 944. Instead, the plurality of lobes 910 are positioned such that the irregular sealing member 910 exhibits rotational symmetry of 360 rotational degrees. In other words, the irregular seal member 944 is not rotationally symmetrical.

Turning to FIGS. 11A-11C, views of a filter element 1002 are shown, according to another example embodiment. The filter element 1002 is similar to the filter element 902 of FIGS. 10A-10C. Like numbering is used to designate like parts between the filter element 1002 and the filter element 102. A difference between the filter element 1002 and the filter element 902 is the filter element 1002 has a lobes that are non-planar (e.g., non-symmetrical, non-repeating, etc.) with a different pattern and formation from the irregular, non-planar seal member of the filter element 902. In other words, the seal member 1044 of the filter element 1002 is irregularly patterned to form a non-planar seal with a complementary seal ring. The filter element 1002 includes a first filter end that includes the first endplate 1040 and a second filter end that includes the irregular seal member 1044. The first endplate 1040 is disposed axially away from the irregular seal member 1044. The filter element 1002 includes filter media 1042 disposed between the first endplate 1040 and the irregular seal member 1044. The internal portion of the filter media 1042 defines a filter cavity 1016.

The irregular seal member 1044 is configured to align with and seal against an internal surface of an external ring portion of a complementary seal ring. As shown in FIG. 11B, the irregular seal member 1044 is above, along, and below a normal parallel seal plane 1072. The irregular seal member 1044 includes a first portion 1006 (e.g., externally facing) and a second portion 1004 (e.g., internally facing). The second portion 1004 is adjacent to and facing the filter cavity 1016 and is substantially smooth. In some embodiments, the surface of the second portion 1004 is configured to be complementary to a surface of a second filter element when the second filter element is disposed within the filter cavity 1016 of the filter element 1002. The first portion 1006 of the irregular seal member 1044 includes a plurality of lobes 1010 that are nonplanar. In other words, lobes in the plurality of lobes 1010 extend along a lower seal plane 1022, radially around the outer surface of the first portion 1006 toward an upper seal plane 1024 such that lobes in the plurality of lobes 1010 are non-planar with other lobes in the plurality of lobes 1010. While the lobes in the plurality of lobes 1010 are not shown with a tab or plurality of tabs, in some embodiments, one or more lobes in the plurality of lobes 1010 may include a tab. In some embodiments, the plurality of lobes 1010 are positioned such that the irregular seal member 1044 does not exhibit rotational symmetry. For example, as shown in FIG. 11C, the plurality of lobes 1010 are not positioned equidistant from one another about a circumference of the irregular seal member 1044. Instead, the plurality of lobes 1010 are positioned such that the irregular sealing member 1044 exhibits rotational symmetry of 360 rotational degrees. In other words, the irregular seal member 1044 is not rotationally symmetrical.

Figure 12A:
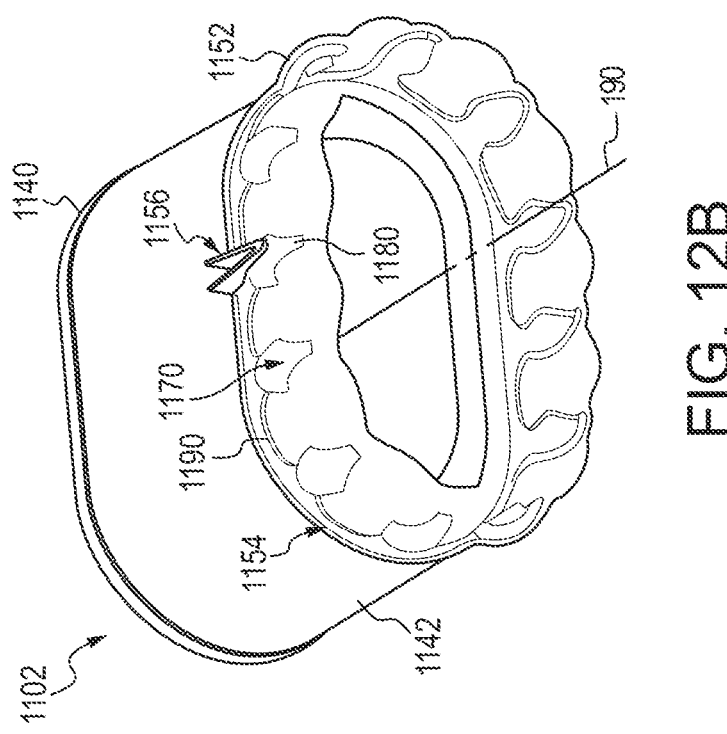
FIG. 12A is a perspective view of a filter element with a seal member having an alignment tab, according to an example embodiment.

Refer to FIGS. 12A-12D, an elliptical (e.g., racetrack, elongated oval, etc.) filter element 1102 having a racetrack shaped support member 1154 with a single alignment tab 1156 is shown, according to an example embodiment. The filter element 1102 includes a first filter end that includes an endplate 1140 and a second filter end that includes the seal member 1144. The endplate 1140 is disposed axially away from the seal member 1144. While the endplate 1140 is shown in FIG. 12A as a closed endplate and the seal member 1144 is at an open filter end, the endplate 1140 may be an open endplate and the seal member 1144 may be at a closed filter end, or the endplate 1140 may be an open endplate and the seal member 1144 may be located at an open filter end. The filter element 1102 includes filter media 1142 disposed between the endplate 1140 and the seal member 1144. The internal portion of the filter media 1142 defines a first filter cavity 1116 that receives the second filter element 104. The filter media 1142 may be similar to the filter media 142 of FIGS. 1-8.

The filter element 1102 may be substantially rigid such that the shape of the filter element 1102 is substantially maintained during installation and use. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying with a stiffening agent, such as BASF® Elastocast 55090, polyurethane, or the like, etc.).

Figure 12B:
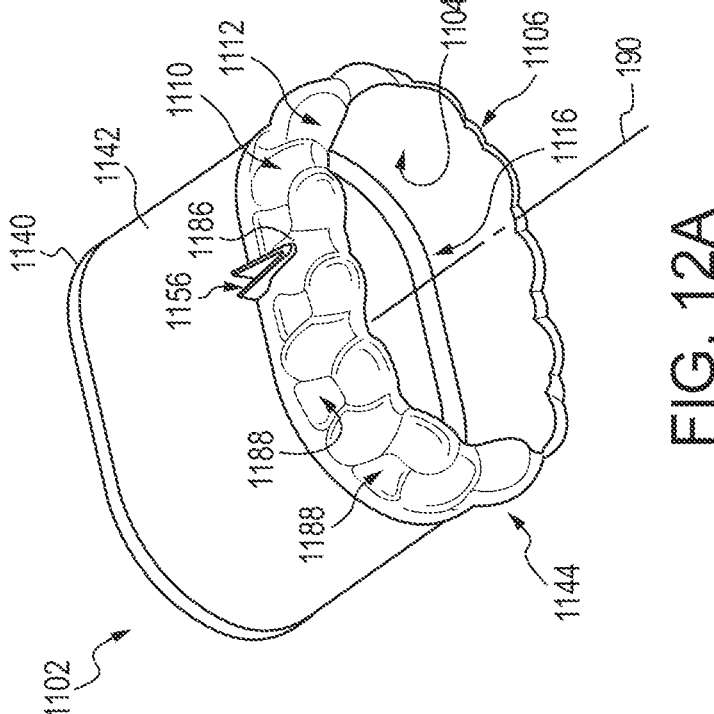
FIG. 12B is a perspective view of a support member and the filter element of FIG. 12A.

The seal member 1144 is configured to align with and seal against a complementary seal ring (not shown). As shown in FIG. 12B, the seal member 1144 is formed with a seal material 1152 and includes a support member 1154 disposed internal of the seal material 1152. In some embodiments, the seal material 1152 is a soft polyurethane or similar material. In other embodiments, the seal material 1152 is a hard urethane or a combination of soft and hard urethane. The seal member 1144 includes a first portion 1106 (e.g., externally facing) and a second portion 1104 (e.g., internally facing). The second portion 1104 is adjacent to and facing the first filter cavity 1116 and is substantially smooth.

The first portion 1106 of the seal member 1144 includes a first plurality of lobes 1110 and a second plurality of lobes 1112. As shown in FIG. 12A, each lobe in the first plurality of lobes 1110 and each lobe in the second plurality of lobes 1112 extends radially outward, away from the second portion 1104 and a central axis 190. Each lobe in the first plurality of lobes 1110 and each lobe in the second plurality of lobes 1112 extend radially outward substantially the same to form a repeating and substantially symmetrical seal surface. Each lobe in the first plurality of lobes 1110 has a substantially bulbous shape. Each lobe in the second plurality of lobes 1112 is positioned between a pair of lobes in the first plurality of lobes 1110 and has a similar shape to the bulbous lobe in the first plurality of lobes 1110. As shown in FIG. 12A, each lobe in the second plurality of lobes 1112 has a different size from the lobes in the first plurality of lobes 1110 such that there is a lobe cavity 1188 defined below the lobe in the second plurality of lobes 1112. In some embodiments, the second plurality of lobes 1112 may have a similar size but different shape from the lobes in the first plurality of lobes 1110. Each lobe in the first plurality of lobes 1110 is shaped to be received by a complementary lobe cavity of a complementary seal ring. Additionally, each lobe in the second plurality of lobes 1112 is shaped to be received by a complementary lobe of a complementary seal ring.

As shown in FIG. 12A, a single lobe 1186 in the first plurality of lobes 1110 includes a tab. As shown in the cross-sectional view in FIG. 12B, the alignment tab 1156 is formed with and protrudes from the support member 1154 that is positioned within the seal member 1144. In some embodiments, only one lobe in the first plurality of lobes 1110 and/or one lobe in the second plurality of lobes 1112 include a tab. In some embodiments, each lobe in the second plurality of lobes 1112 includes a tab. In other embodiments, tabs are included on lobes from both the lobe the first plurality of lobes 1110 and second plurality of lobes 1112.

Figure 12D:
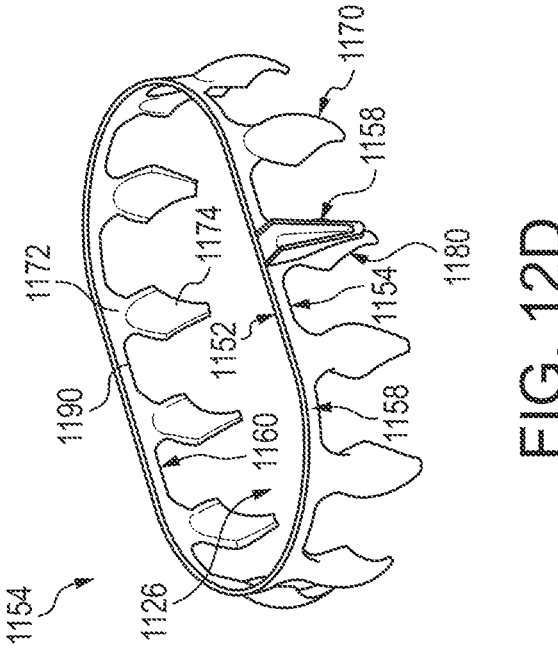
FIG. 12D is a perspective view of the support member of FIG. 12C.
Figure 12C:
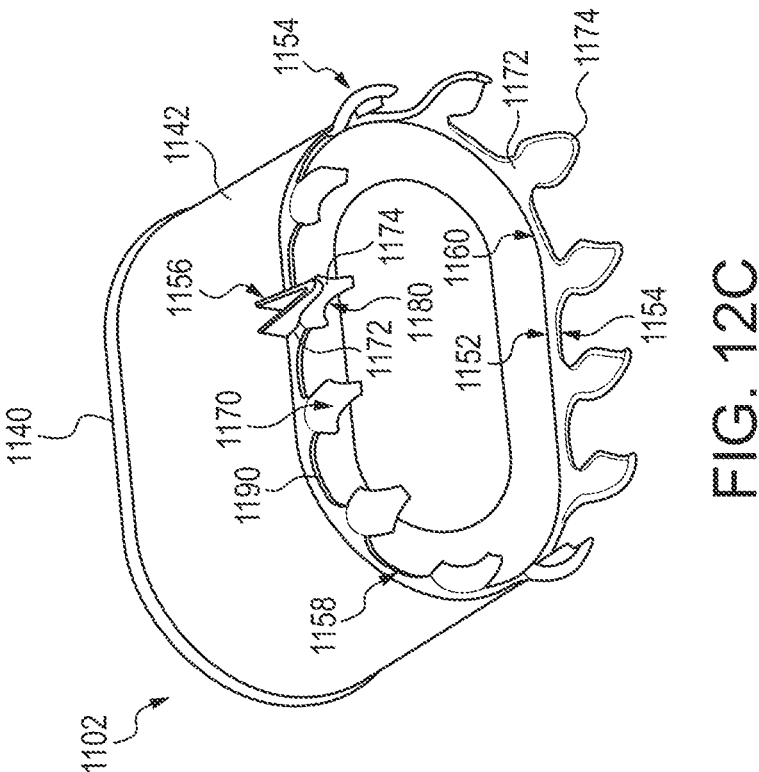
FIG. 12C is a perspective view of the support member of the filter element of FIG. 12A.

As shown in FIGS. 12B and 12C, the support member 1154 is integrated with the seal member 1144. The support member 1154 may be mechanically disposed within the seal member 1144 and retained on the filter to provide the alignment tab 1156 extending radially outward (e.g., away from the central axis 190) and configured to align with and be inserted within a complementary pocket of the seal ring to allow for the filter element 1102 to be properly aligned during the installation process (e.g., form a seal) within a filter housing.

As shown in FIG. 12D, the support member 1154 includes a first end 1152, a second end 1154, and a central opening 1126. An internal surface 1160 and an external surface 1158 are disposed between the first end 1152 and the second end 1154. A plurality of force distribution members 1170 extend from the first end 1152 toward and past the second end 1154. Each force distribution member in the plurality of force distribution members 1170 is configured to allow for the seal member 1144 material (e.g., urethane foam) to form through portions of the support member 1154 and retain the support member 1154 within the seal member 1144. A plurality of connecting members 1190 are disposed between force distribution members in the plurality of force distribution members 1170. In other words, a force distribution member in the plurality of force distribution members 1170 is coupled to an end of a connecting member in the plurality of connecting members 1190 and an adjacent force distribution member in the plurality of force distribution members 1170 is coupled to the other end of the connecting member.

Each force distribution member in the plurality of force distribution members 1170 has a connecting portion 1172 and a force distribution portion 1174. The connecting portion 1172 extends from the first end 1152 toward the second end 1154. The connecting portion 1172 is substantially smooth and flat as it extends from a connecting member to an adjacent connecting member in the plurality of connecting members 1190. The force distribution portion 1174 extends from the second end 1154 away from the first end 1152. The force distribution portion 1174 extends inward toward the central axis 190 as the force distribution portion 1174 extends away from the first end 1152. The force distribution portion 1174 includes a tri-point shape that is configured to allow for the seal member 1144 material (e.g., urethane foam) to form around portions of the force distribution portion 1174 and retain the support member 1154 within the seal member 1144. A single force distribution member 1180 in the plurality of force distribution members 1170 includes the alignment tab 1156. The alignment tab 1156 extends radially outward (e.g., away from the central axis 190) and configured to align with and be inserted within a complementary pocket of the seal ring to allow for the filter element 1102 to be properly aligned during the installation process (e.g., form a seal) within a filter housing. As shown in FIG. 12D, the alignment tab 1156 is v-shaped.

Turning to FIGS. 13A-13C, views of a filter element 1202 with a square lobe seal member 1244 are shown, according to another example embodiment. The filter element 1202 is similar to the filter element 102 of FIGS. 1-8. Like numbering is used to designate like parts between the filter element 1202 and the filter element 102. A difference between the filter element 1202 and the filter element 102 is the filter element 1202 has a square filter element shape and a square lobe seal member 1244. The seal member 1244 of the filter element 1202 includes an irregular, non-planar seal structure that is configure to align with and engage a complementary seal ring in a filter housing. The filter element 1202 includes a first filter end 1204, a second filter end 1208 disposed axially away from the first filter end 1204, and a filter seal member 1244 positioned between the two ends and closer to the second filter end 1208. The filter element 1202 includes filter media 1212 disposed between the first filter end 1204 and the second filter end 1208. A filter media cover 1210 (e.g., flat surface) is positioned around the perimeter of the filter media 1212.

The lobe seal member 1244 is configured to align with and seal against an internal surface of an external ring portion of a complementary seal ring. As shown in FIG. 13C, the lobe seal member 1244 includes a first end 1280 and a second end 1282 disposed axially away from the first end 1280. A first portion 1290 (e.g., externally facing) and a second portion 1292 (e.g., internally facing) are disposed between the first end 1280 and the second end 1282. The second portion 1292 is adjacent to and facing the filter media cover 1210 and is substantially smooth. The first portion 1290 includes a first corner lobe 1230, a second corner lobe 1240, a third corner lobe 1250, and a fourth corner lobe 1260. As shown in FIGS. 13A and 13C, the first corner lobe 1230 is substantially coplanar (e.g., at the same height as) to the fourth corner lobe 1260. The second corner lobe 1240 is substantially coplanar (e.g., at the same height as) to the third corner lobe 1250. The first corner lobe 1230 and the fourth corner lobe 1260 are positioned near the first filter end 1204. The second corner lobe 1240 and the third corner lobe 1250 are positioned away from the first filter end 1204, axially towards the second filter end 1208.

A first plurality of lobes 1232 extend from the first corner lobe 1230 axially downward (e.g., toward the second filter end 1208) toward the second corner lobe 1240. A second plurality of lobes 1242 extend from the second corner lobe 1240 substantially straight (e.g., substantially parallel to the first filter end 1204) toward the third corner lobe 1250. A third plurality of lobes 1252 extend from the third corner lobe 1250 axially upward (e.g., away from the second filter end 1208) toward the fourth corner lobe 1260. A fourth plurality of lobes 1262 extend from the fourth corner lobe 1260 substantially straight (e.g., substantially parallel to the first filter end 1204) toward the first corner lobe 1230. While the plurality of lobes and corner lobes are not shown with a tab or plurality of tabs, in some embodiments, the plurality of lobes and/or corner lobes may include a tab and/or a plurality of tabs.

Figures 14A, 14B, 14C:
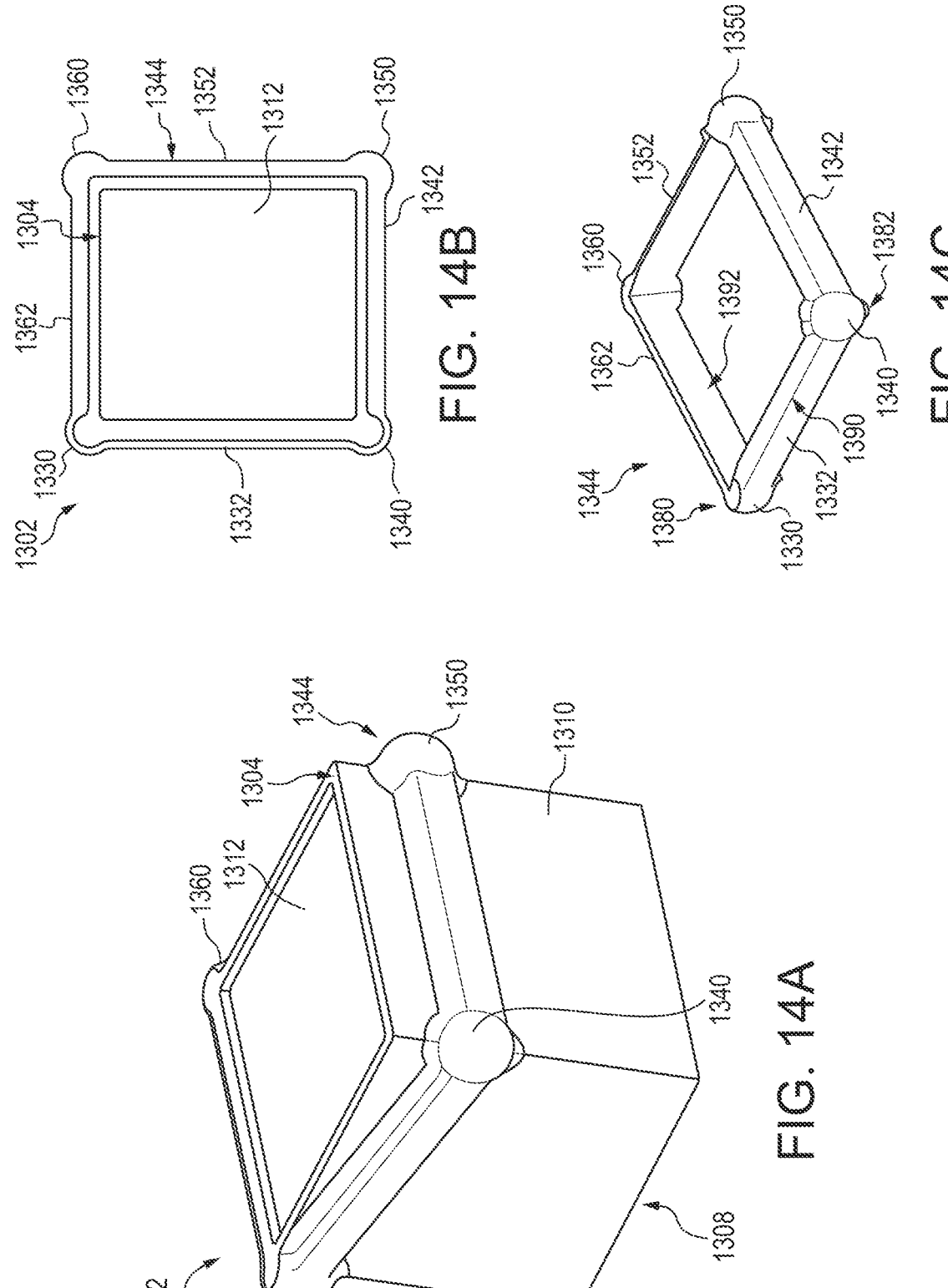
FIG. 14A is a perspective view of a square filter element with a patterned lobe seal member, according to another example embodiment.
FIG. 14B is a top view of the square filter element with a patterned lobe seal member of FIG. 14A.
FIG. 14C is a perspective view of the patterned lobe seal member of the filter element of FIG. 14A.

Turning to FIGS. 14A-14C, views of a filter element 1302 with a square lobe seal member 1344 are shown, according to another example embodiment. The filter element 1302 is similar to the filter element 102 of FIGS. 1-8. Like numbering is used to designate like parts between the filter element 1302 and the filter element 102. A difference between the filter element 1302 and the filter element 102 is the filter element 1302 has a square filter element shape and a square lobe seal member 1344. The seal member 1344 of the filter element 1302 includes an irregular, non-planar seal structure that is configure to align with and engage a complementary seal ring in a filter housing. The filter element 1302 includes a first filter end 1304, a second filter end 1308 disposed axially away from the first filter end 1304, and a filter seal member 1344 positioned between the two ends and closer to the first filter end 1304. The filter element 1302 includes filter media 1312 disposed between the first filter end 1304 and the second filter end 1308. A filter media cover 1310 (e.g., flat surface) is positioned around the perimeter of the filter media 1312.

The lobe seal member 1344 is configured to align with and seal against an internal surface of an external ring portion of a complementary seal ring. As shown in FIG. 14C, the lobe seal member 1344 includes a first end 1380 and a second end 1382 disposed axially away from the first end 1380. A first portion 1390 (e.g., externally facing) and a second portion 1392 (e.g., internally facing) are disposed between the first end 1380 and the second end 1382. The second portion 1392 is adjacent to and facing the filter media cover 1310 and is substantially smooth. The first portion 1390 includes a first corner lobe 1330, a second corner lobe 1340, a third corner lobe 1350, and a fourth corner lobe 1360. As shown in FIGS. 14A and 14C, the first corner lobe 1330 is substantially coplanar (e.g., at the same height as) with the fourth corner lobe 1360. The second corner lobe 1340 is substantially coplanar (e.g., at the same height as) with the third corner lobe 1350. The first corner lobe 1330 and the fourth corner lobe 1360 are positioned near the first filter end 1304. The second corner lobe 1340 and the third corner lobe 1350 are positioned away from the first filter end 1304, axially towards the second filter end 1308. While the corner lobes are not shown with a tab or plurality of tabs, in some embodiments, the corner lobes may include a tab and/or a plurality of tabs.

A first lobe 1332 extends from the first corner lobe 1330 axially downward (e.g., toward the second filter end 1308) toward the second corner lobe 1340. A second lobe 1342 extends from the second corner lobe 1340 substantially straight (e.g., substantially parallel to the first filter end 1304) toward the third corner lobe 1350. A third of lobe 1352 extends from the third corner lobe 1350 axially upward (e.g., away from second filter end 1308) toward the fourth corner lobe 1360. A fourth of lobe 1362 extends from the fourth corner lobe 1360 substantially straight (e.g., substantially parallel to the first filter end 1304) toward the first corner lobe 1330. Each of the first lobe 1332, second lobe 1342, third lobe 1352, and/or fourth lobe 1362 may include one or more undercuts, tabs, or other features, as described in other embodiments herein.

Figure 15A:
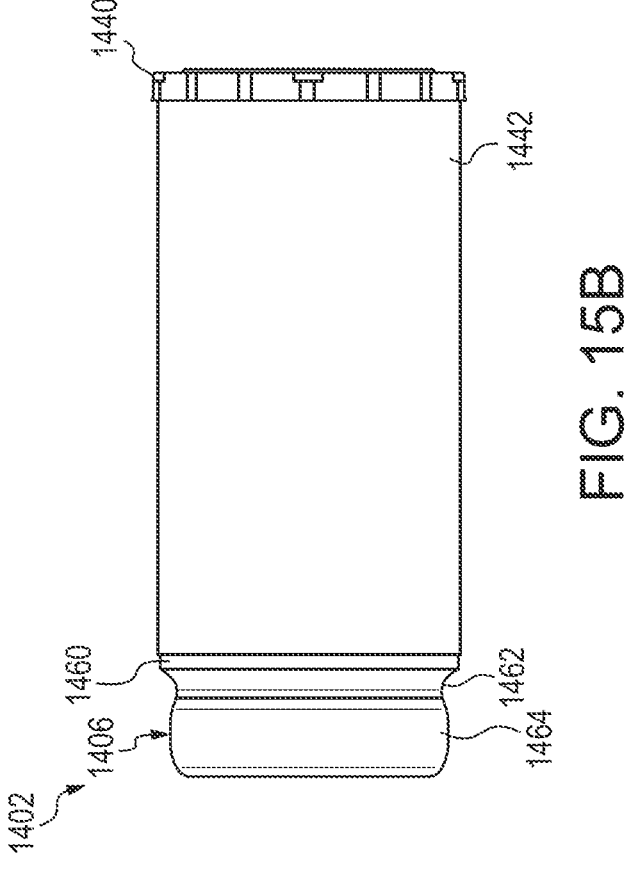
FIG. 15A is a perspective view of a filter element with a continuous lobe seal member, according to an example embodiment.
Figure 15B:
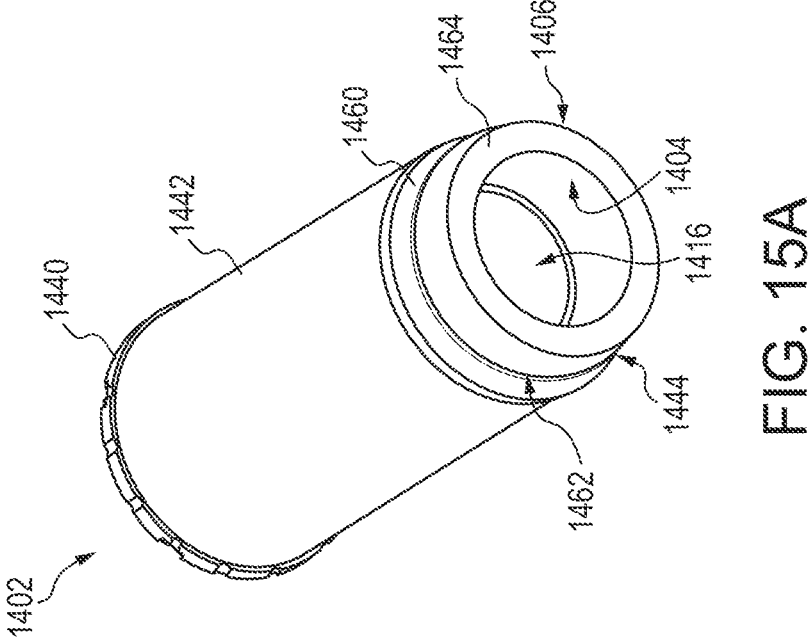
FIG. 15B is a side view of the filter element with a continuous lobe seal member of FIG. 15A.

Turning to FIGS. 15A and 15B, views of a filter element 1402 are shown, according to another example embodiment. The filter element 1402 is similar to the filter element 102 of FIGS. 1-8. Like numbering is used to designate like parts between the filter element 1402 and the filter element 102. A difference between the filter element 1402 and the filter element 102 is the filter element 1402 has a continuous lobe seal member 1444. In other words, the seal member 1444 of the filter element 1402 includes a single lobe 1464 that protrudes from the filter element end and defines an undercut to engage a complementary seal ring in a filter housing. The filter element 1402 includes a first filter end that includes the first endplate 1440 and a second filter end that includes the continuous lobe seal member 1444. The first endplate 1440 is disposed axially away from the continuous lobe seal member 1444. The filter element 1402 includes filter media 1442 disposed between the first endplate 1440 and the continuous lobe seal member 1444. The internal portion of the filter media 1442 defines a filter cavity 1416.

The continuous lobe seal member 1444 is configured to align with and seal against an internal surface of an external ring portion of a complementary seal ring. As shown in FIG. 15B, the continuous lobe seal member 1444 includes a filter element end 1460 and a continuous lobe 1464. An undercut 1462 is defined between the filter element end 1460 and the continuous lobe 1464 due to the curvature and shape difference of the filter element end 1460 and the continuous lobe 1464. The undercut 1462 defines a radius that is less than the radius defined by continuous lobe 1464, forming a valley between the filter element end 1460 and the continuous lobe 1464. The continuous lobe seal member 1444 includes a first portion 1406 (e.g., externally facing) and a second portion 1404 (e.g., internally facing). The second portion 1404 is adjacent to and facing the filter cavity 1416 and is substantially smooth. In some embodiments, the surface of the second portion 1404 is configured to be complementary to a surface of a second filter element when the second filter element is disposed within the filter cavity 1416 of the filter element 1402. The first portion 1406 of the continuous lobe seal member 1444 includes the continuous lobe 1464. While the continuous lobe 1464 is not shown with a tab or plurality of tabs, in some embodiments, the continuous lobe 1464 may include a tab and/or a plurality of tabs.

Figure 16A:
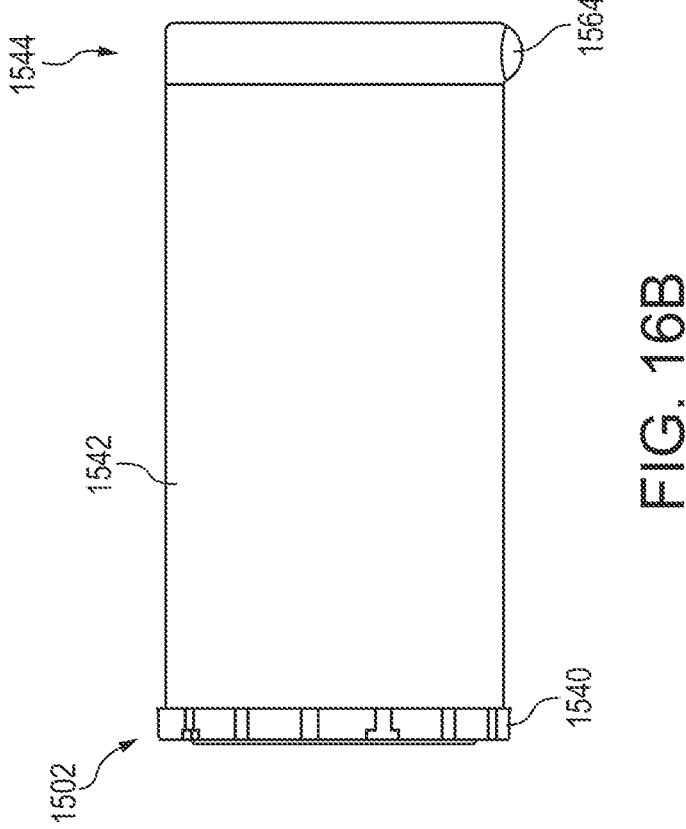
FIG. 16A is a perspective view of a filter element with a single lobe seal member, according to another example embodiment.
Figure 16B:
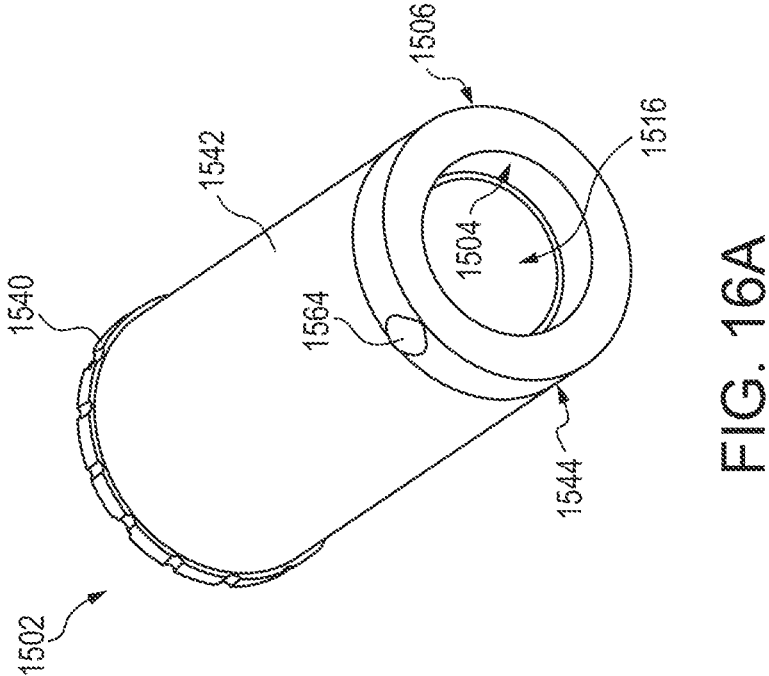
FIG. 16B is a side view of the filter element with a single lobe seal member of FIG. 16A.

Turning to FIGS. 16A and 16B, views of a filter element 1502 are shown, according to another example embodiment. The filter element 1502 is similar to the filter element 1402 of FIGS. 15A and 15B. Like numbering is used to designate like parts between the filter element 1502 and the filter element 1402. A difference between the filter element 1502 and the filter element 1402 is the filter element 1502 has a single lobe seal member 1544. In other words, the seal member 1544 of the filter element 1502 includes a single lobe 1564 that protrudes from the filter element end and defines an undercut to engage a complementary seal ring in a filter housing. The filter element 1502 includes a first filter end that includes the first endplate 1540 and a second filter end that includes the single lobe seal member 1544. The first endplate 1540 is disposed axially away from the single lobe seal member 1544. The filter element 1502 includes filter media 1542 disposed between the first endplate 1540 and the single lobe seal member 1544. The internal portion of the filter media 1542 defines a filter cavity 1516.

The single lobe seal member 1544 is configured to align with and seal against an internal surface of an external ring portion of a complementary seal ring. As shown in FIG. 16B, the single lobe seal member 1544 includes a single lobe 1564. The single lobe seal member 1544 includes a first portion 1506 (e.g., externally facing) and a second portion 1504 (e.g., internally facing). The second portion 1504 is adjacent to and facing the filter cavity 1516 and is substantially smooth. In some embodiments, the surface of the second portion 1504 is configured to be complementary to a surface of a second filter element when the second filter element is disposed within the filter cavity 1516 of the filter element 1502. The first portion 1506 of the single lobe seal member 1544 includes the single lobe 1564 and is substantially smooth around the single lobe 1564 and around the remainder of the first portion 1506. While the single lobe 1564 is not shown with a tab or plurality of tabs, in some embodiments, the single lobe 1564 may include a tab and/or a plurality of tabs.

Figures 17A, 17B:
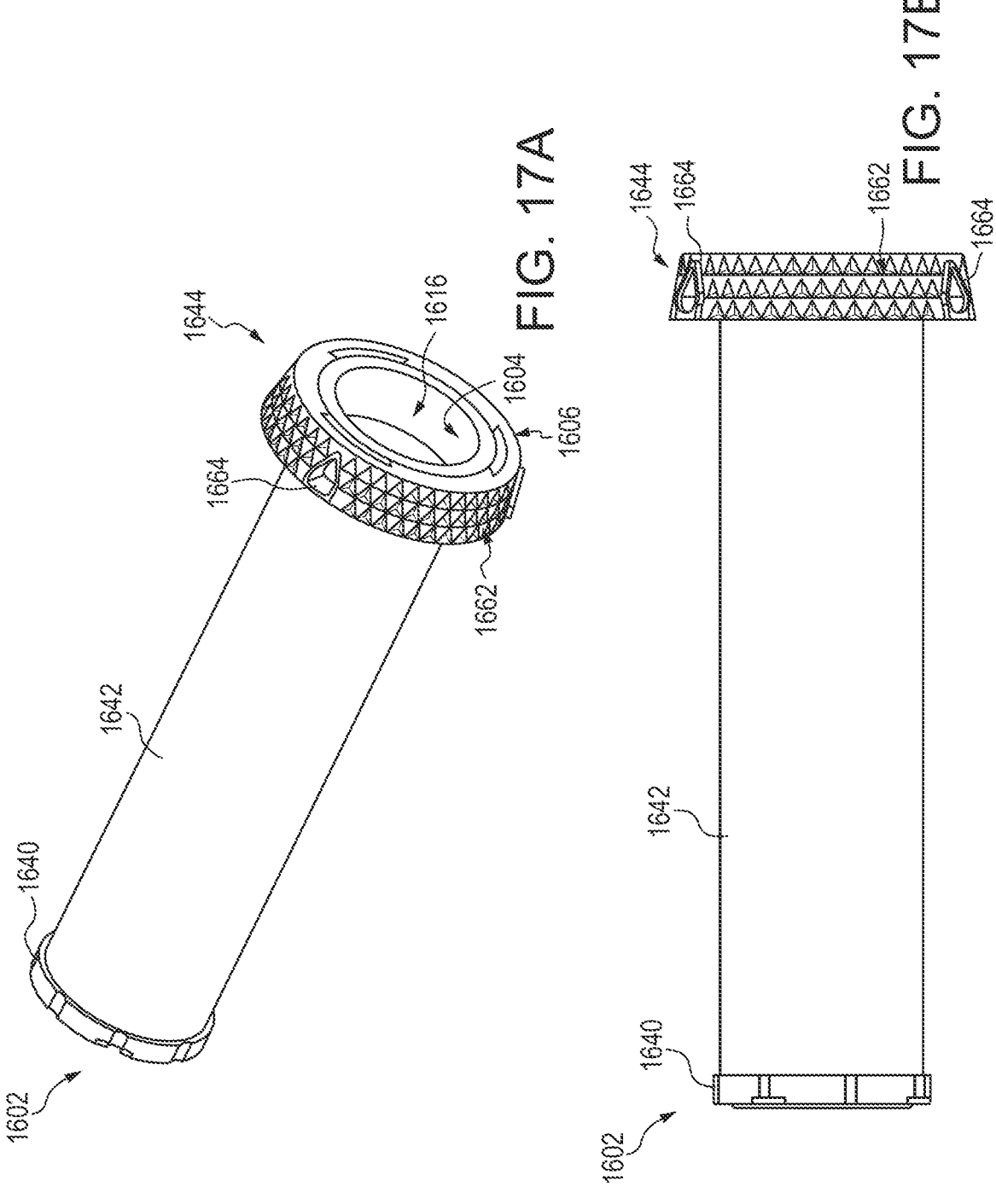
FIG. 17A is a perspective view of a filter element with a faceted seal member, according to another example embodiment.
FIG. 17B is a side view of the filter element with a faceted seal member of FIG. 17A.

Turning to FIGS. 17A and 17B, views of a filter element 1602 are shown, according to another example embodiment. The filter element 1602 is similar to the second filter element 104 of FIGS. 1-8. Like numbering is used to designate like parts between the filter element 1602 and the second filter element 104. A difference between the filter element 1602 and the second filter element 104 is the filter element 1602 has a faceted seal member 1644 that includes individual undercut facets 1662. In other words, the seal member 1644 of the filter element 1602 includes a plurality of alignment features 1664 that protrude from the filter element end to engage a complementary seal member 1620 in a filter housing. The filter element 1602 includes a first filter end that includes the first endplate 1640 and a second filter end that includes the faceted seal member 1644. The first endplate 1640 is disposed axially away from the faceted seal member 1644. The filter element 1602 includes filter media 1642 disposed between the first endplate 1640 and the faceted seal member 1644. The internal portion of the filter media 1642 defines a filter cavity 1616.

Figures 17C, 17D:
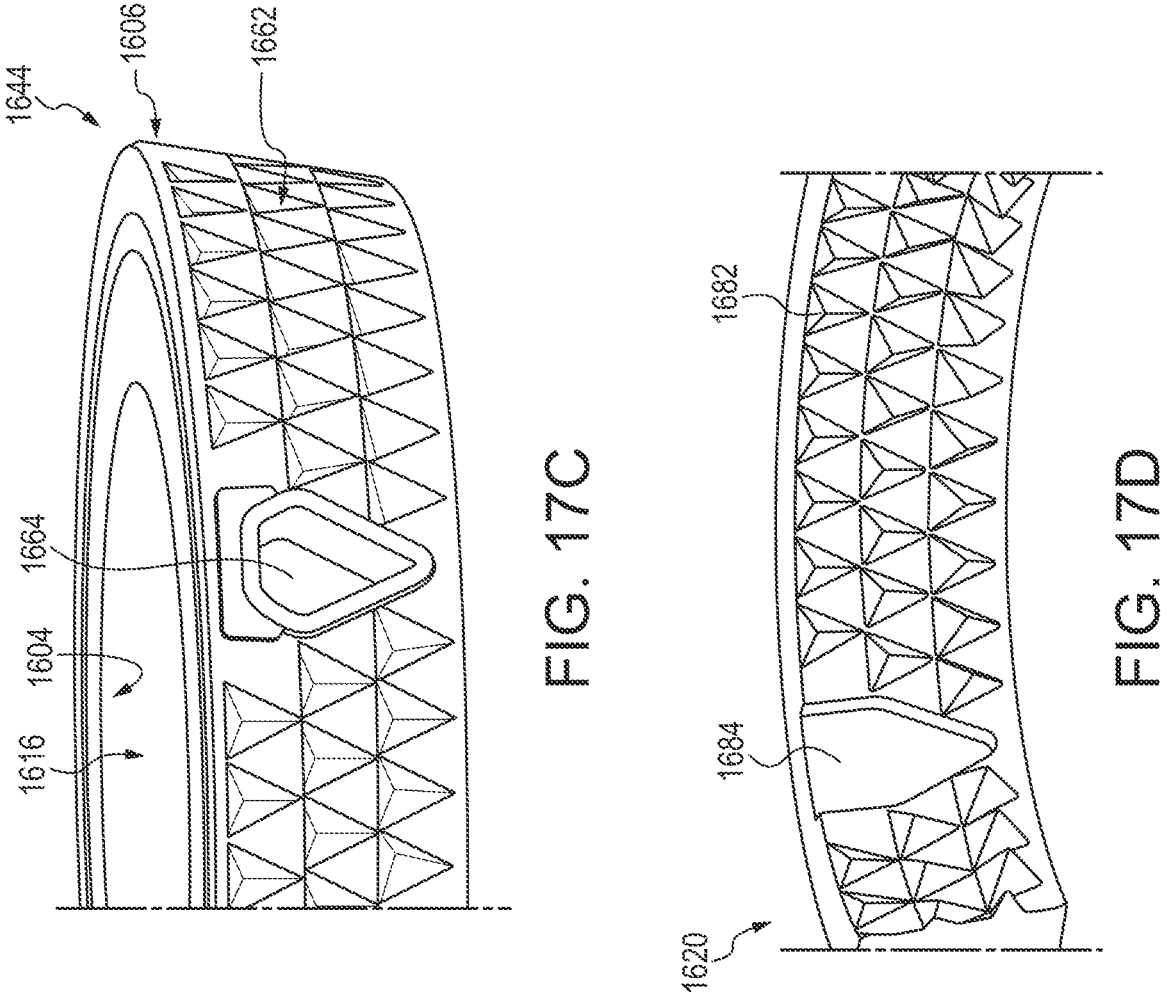
FIG. 17C is a perspective view of a portion of the faceted seal member of FIG. 17A.
FIG. 17D is a perspective view of a portion of a surface of a housing seal member complementary to the faceted seal member of FIG. 17C.

As shown in FIGS. 17A-C, the faceted seal member 1644 includes a plurality of alignment features 1664 and undercut facets 1662. Generally, the faceted seal member 1644 is configured to align with and seal against an internal surface of a complementary housing seal member 1620 of a filter housing, as shown in FIG. 17D. Specifically, the undercut facets 1662 include the undercut and receive a complementary protruding facet 1682 from the housing seal member 1620. The alignment features 1664 are configured to align with and engage complementary alignment cavities 1684 in the filter housing seal member 1620. The undercut facets 1662 may be configured to provide retention to keep the filter element 1602 in place when installed within the filter housing. The faceted seal member 1644 includes a first portion 1606 (e.g., externally facing) and a second portion 1604 (e.g., internally facing). The second portion 1604 is adjacent to and facing the filter cavity 1616 and is substantially smooth. The first portion 1606 of the faceted seal member 1644 includes the alignment features 1664 and has the undercut facets 1662 around the remainder of the first portion 1606. While the undercut facets 1662 are shown in a patterned formation, in some embodiments the undercut facets 1662 are not patterned. While the alignment features 1664 are not shown with a tab or plurality of tabs, in some embodiments, the alignment features 1664 may include a tab and/or a plurality of tabs. In some embodiments, the alignment features 1664 may be part of a structural member. In other embodiments, the alignment features 1664 are part of the urethane/compliant material itself. In some embodiments, the filter element 1602 includes features on the internal surface and/or the external surface for alignment and sealing similar to the two filter element embodiments of FIGS. 1-8.

Figure 18A:
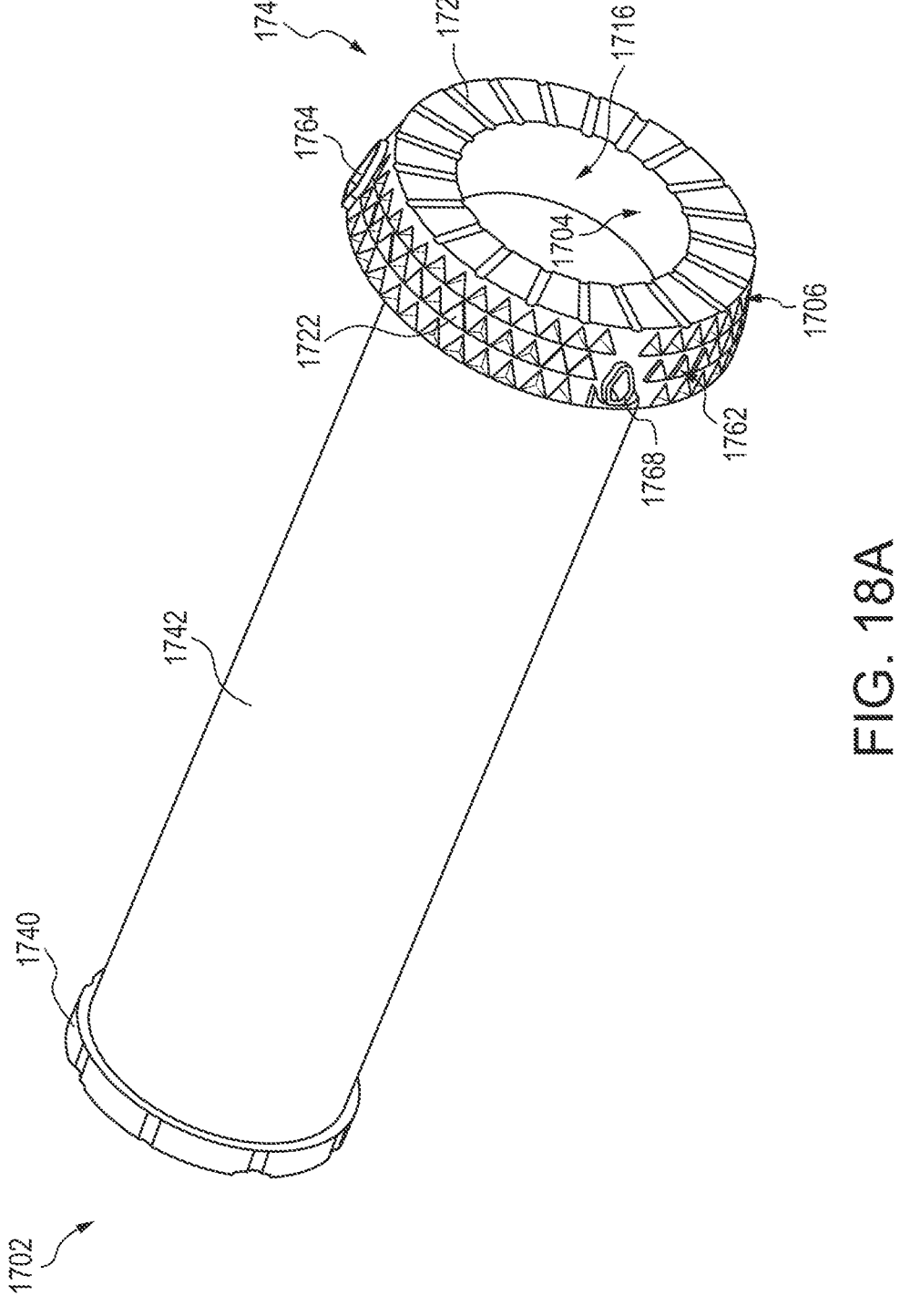
FIG. 18A is a perspective view of a filter element with an irregular faceted seal member, according to another example embodiment.
Figures 18B, 18C:
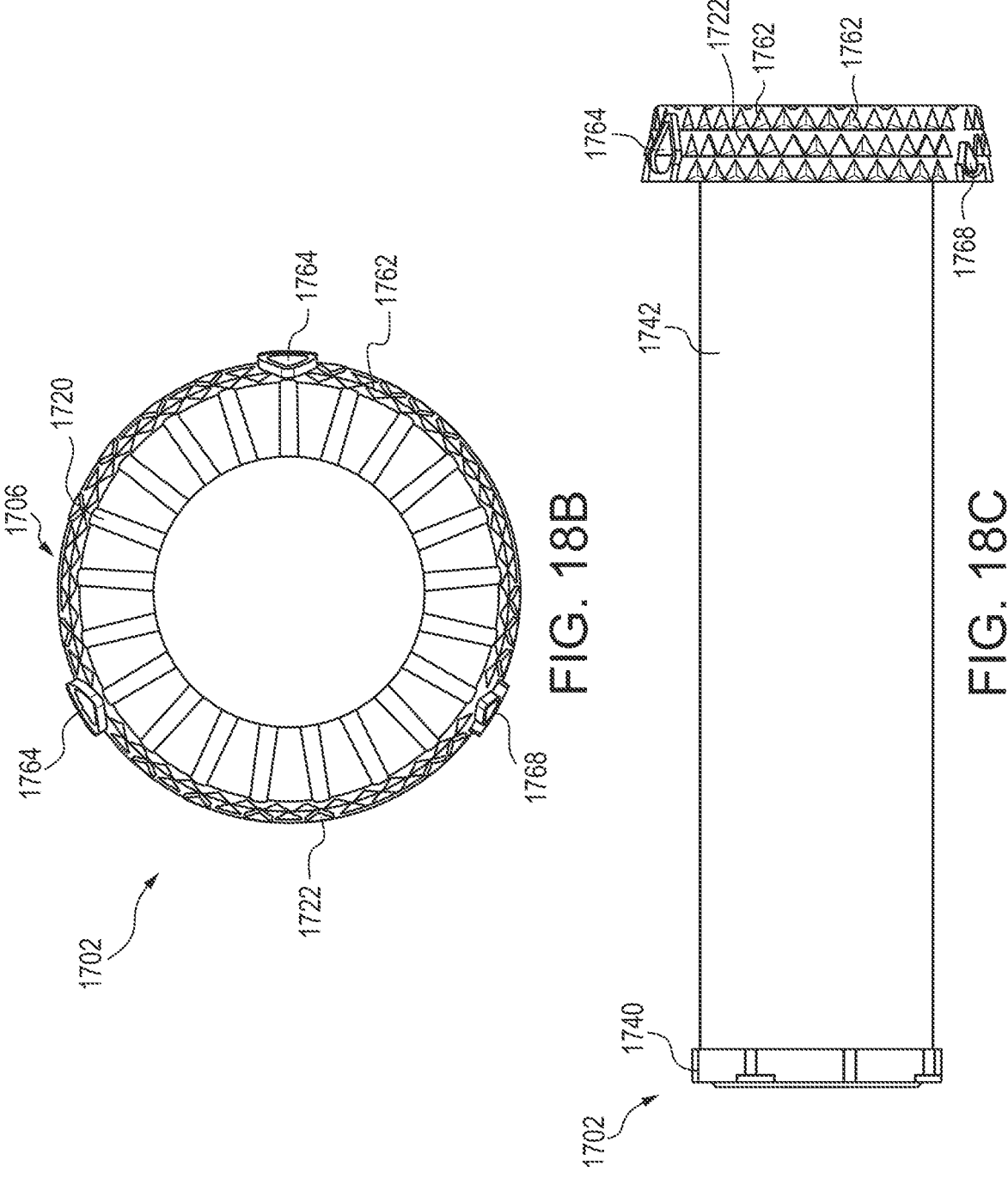
FIG. 18B is a top view of a portion of the irregular faceted seal member of FIG. 18A.
FIG. 18C is a side view of the filter element with the irregular faceted seal member of FIG. 18A.

Turning to FIGS. 18A-C, views of a filter element 1702 are shown, according to another example embodiment. The filter element 1702 is similar to the filter element 1602 of FIGS. 17A-17D. Like numbering is used to designate like parts between the filter element 1702 and the filter element 1602. A difference between the filter element 1702 and the second filter element 1602 is the filter element 1702 has an irregular faceted seal member 1744 that includes individual undercut facets 1762. In other words, the seal member 1744 of the filter element 1702 includes a pair of alignment features 1764 and a smaller (e.g., in relation to the pair of alignment features 1764) alignment feature 1768 that protrude from the filter element end to engage a complementary seal member in a filter housing. The filter element 1702 includes a first filter end that includes the first endplate 1740 and a second filter end that includes the faceted seal member 1744. The first endplate 1740 is disposed axially away from the faceted seal member 1744. The filter element 1702 includes filter media 1742 disposed between the first endplate 1740 and the faceted seal member 1744. The internal portion of the filter media 1742 defines a filter cavity 1716.

As shown in FIGS. 18B and 18C, the faceted seal member 1744 includes a pair of alignment features 1764, a smaller alignment feature 1768, and undercut facets 1762. The undercut facets 1762 are irregular such that protruding facets 1722 are disposed along the receding facets along the surface of the undercut facets 1762. Generally, the faceted seal member 1744 is configured to align with and seal against an internal surface of a complementary housing seal member of a filter housing. Specifically, the undercut facets 1762 include the undercut and receive a complementary protruding facet from the housing seal member with the irregular protruding facets 1722 protruding into a complementary pocket in the housing seal member of the filter housing. The pair of alignment features 1764 and the smaller alignment feature 1768 are configured to align with and engage complementary alignment cavities in the filter housing seal member. The implementation of the smaller alignment feature 1768 ensures a specific orientation of the filter element 1702 within the filter housing. The undercut facets 1762 may be configured to provide retention to keep the filter element 1702 in place when installed within the filter housing.

The faceted seal member 1744 includes a first portion 1706 (e.g., externally facing) and a second portion 1704 (e.g., internally facing). The second portion 1704 is adjacent to and facing the filter cavity 1716 and is substantially smooth. The first portion 1706 of the faceted seal member 1744 includes the pair of alignment features 1764, the smaller alignment feature 1768, and has the undercut facets 1762 around the remainder of the first portion 1706. A plurality of humped arches 1720 are positioned along the bottom surface of the faceted seal member 1744 between the first portion 1706 and the second portion 1704. While the undercut facets 1762 are shown in a patterned formation, in some embodiments the undercut facets 1762 are not patterned. While the pair of alignment features 1764 and/or smaller alignment feature 1768 are not shown with a tab or plurality of tabs, in some embodiments the pair of alignment features 1764 and/or smaller alignment feature 1768 may include a tab and/or a plurality of tabs. In some embodiments, the pair of alignment features 1764 and/or the smaller alignment feature 1768 may be part of a structural member. In other embodiments, the pair of alignment features 1764 and/or the smaller alignment feature 1768 are part of the urethane/compliant material itself. In some embodiments, the filter element 1702 includes features on the internal surface and/or the external surface for alignment and sealing similar to the two filter element embodiments of FIGS. 1-8.

It is understood that the various components, configurations, and features of the different embodiments of the filter seal member may be combined according to the desired use and configuration.

The term "connected" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that any element disclosed in one embodiment may be incorporated or utilized with any other embodiment disclosed herein. For example, the seal ring 220 of the exemplary embodiment described in at least paragraphs [0085]-[0091] may be configured to receive and form a sealing engagement with any of the seal members 144, 164, 844, 944, 1044, 1144, 1244, 1344, 1444, 1544, 1644, 1744 disclosed above. Although only one example of an element from one embodiment that can be incorporated or utilized in another embodiment has been described above, it should be appreciated that other elements of the various embodiments may be incorporated or utilized with any of the other embodiments disclosed herein.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, unless otherwise specifically noted, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filtration system comprising:
   a filter housing defining an internal cavity, the filter housing comprising:
   a first housing end;
   a second housing end disposed axially away from the first housing end; and
   a housing seal member adjacent the second housing end, the housing seal member defining a seal channel configured to receive a filter seal member, the housing seal member comprising:
   a first member end;
   a second member end disposed axially away from the first member end;
   a first member portion disposed between the first member end and the second member end, the first member portion comprising a first undercut for receiving a filter seal member of a first filter element, the first undercut configured to form a seal with the filter seal member; and
   a second member portion disposed between the first member end and the second member end, the second member portion disposed radially away from the first member portion; and
   the first filter element disposed within the internal cavity, the first filter element comprising:
   a first filter end;
   a second filter end disposed axially away from the first filter end;
   a filter media disposed between the first filter end and the second filter end; and
   the filter seal member formed on the second filter end, the filter seal member comprising a first plurality of lobes and a second plurality of lobes, each lobe in the second plurality of lobes positioned between a pair of lobes in the first plurality of lobes,
   wherein the second member portion is positioned radially inward from the first member portion, the second member portion comprising a second undercut for receiving a second filter seal member of a second filter element, the second undercut configured to form a seal with the second filter seal member, the second filter element positioned within the first filter element.

2. A filtration system comprising:

a filter housing defining an internal cavity, the filter housing comprising:

a first housing end;

a second housing end disposed axially away from the first housing end; and a housing seal member adjacent the second housing end, the housing seal member defining a seal channel configured to receive a filter seal member; and a filter element disposed within the internal cavity, the filter element comprising:

a first filter end;

a second filter end disposed axially away from the first filter end;

a filter media disposed between the first filter end and the second filter end; and the filter seal member formed on the second filter end, the filter seal member comprising a first plurality of lobes and a second plurality of lobes, each lobe in the second plurality of lobes positioned between a pair of lobes in the first plurality of lobes, wherein the housing seal member comprises a plurality of pockets and each lobe in the first plurality of lobes comprises a tab, wherein each tab is configured to align with and engage a pocket in the plurality of pockets when the filter seal member is disposed within the seal channel.

3. A filtration system comprising:

a filter housing defining an internal cavity, the filter housing comprising:

a first housing end;

a second housing end disposed axially away from the first housing end; and a housing seal member adjacent the second housing end, the housing seal member defining a seal channel configured to receive a filter seal member; and a filter element disposed within the internal cavity, the filter element comprising:

a first filter end;

a second filter end disposed axially away from the first filter end;

a filter media disposed between the first filter end and the second filter end; and the filter seal member formed on the second filter end, the filter seal member comprising a first plurality of lobes and a second plurality of lobes, each lobe in the second plurality of lobes positioned between a pair of lobes in the first plurality of lobes, wherein the housing seal member comprises:

a first member end;

a second member end disposed axially away from the first member end;

a first member surface disposed between the first member end and the second member end, the first member surface comprising a first plurality of lobe cavities configured to receive the first plurality of lobes; and a second member surface disposed between the first member end and the second member end and disposed radially away from the first member surface, the second member surface comprising a second plurality of lobe cavities configured to receive the second plurality of lobes, wherein a member channel is formed between the first member surface and the second member surface, the member channel comprising a closed portion adjacent the second member end and an open portion adjacent the first member end.

4. A filtration system comprising:

a filter housing defining an internal cavity, the filter housing comprising:

a first housing end;

a second housing end disposed axially away from the first housing end; and a housing seal member adjacent the second housing end, the housing seal member defining a seal channel configured to receive a filter seal member; and a filter element disposed within the internal cavity, the filter element comprising:

a first filter end;

a second filter end disposed axially away from the first filter end;

a filter media disposed between the first filter end and the second filter end; and the filter seal member formed on the second filter end, the filter seal member comprising a first plurality of lobes and a second plurality of lobes, each lobe in the second plurality of lobes positioned between a pair of lobes in the first plurality of lobes, wherein each lobe in the first plurality of lobes comprises a bulbous shape having a first height that extends radially away from the second filter end and each lobe in the second plurality of lobes comprises a bulbous shape that has a second height that extends radially away from the second filter end, wherein the first height extends axially away from the first filter end farther than the second height.

5. A filtration system comprising:

a filter housing defining an internal cavity, the filter housing comprising:

a first housing end;

a second housing end disposed axially away from the first housing end; and a housing seal member adjacent the second housing end, the housing seal member defining a seal channel configured to receive a filter seal member, the housing seal member comprising:

a first member end;

a second member end disposed axially away from the first member end;

a first member portion disposed between the first member end and the second member end, the first member portion comprising an undercut for receiving a filter seal member of a first filter element, the undercut configured to form a seal with the filter seal member; and a second member portion disposed between the first member end and the second member end, the second member portion disposed radially away from the first member portion; and the first filter element disposed within the internal cavity, the first filter element comprising:

a first filter end;

a second filter end disposed axially away from the first filter end;

a filter media disposed between the first filter end and the second filter end; and the filter seal member formed on the second filter end, the filter seal member comprising a first plurality of lobes and a second plurality of lobes, each lobe in the second plurality of lobes positioned between a pair of lobes in the first plurality of lobes, wherein a member channel is defined between the first member portion and the second member portion, and wherein the member channel comprises a plurality of lobe cavities, the plurality of lobe cavities configured to receive the first plurality of lobes on the filter seal member of the first filter element.

6. The filtration system of claim 5, wherein the member channel comprises a pocket extending into one of the first member portion and the second member portion and configured to receive a tab extending from the filter seal member of the first filter element.

7. The filtration system of claim 5, wherein the plurality of lobe cavities are substantially equidistantly positioned about the member channel such that the member channel exhibits rotational symmetry of equal to or less than 180 rotational degrees.

8. The filtration system of claim 5, wherein the plurality of lobe cavities are asymmetrically positioned circumferentially about the member channel such that the member channel does not exhibit rotational symmetry.

9. A filtration system comprising:
a filter housing defining an internal cavity, the filter housing comprising:
a first housing end;
a second housing end disposed axially away from the first housing end; and
a housing seal member adjacent the second housing end, the housing seal member defining a seal channel configured to receive a filter seal member; and
a filter element disposed within the internal cavity, the filter element comprising:
a first filter end;
a second filter end disposed axially away from the first filter end;
filter media disposed between the first filter end and the second filter end; and
the filter seal member formed on the second filter end, the filter seal member comprising a first plurality of lobes and a second plurality of lobes, at least one of a shape, size, and configuration of each lobe of the first plurality of lobes is different than a corresponding shape, size, and configuration of each lobe of the second plurality of lobes, each lobe in the second plurality of lobes positioned between a pair of lobes in the first plurality of lobes.

10. The filtration system of claim 9, wherein the filter element is a first filter element, and wherein the housing seal member comprises:
a first member end;
a second member end disposed axially away from the first member end;
a first member portion disposed between the first member end and the second member end, the first member portion comprising an undercut for receiving a filter seal member of the first filter element, the undercut configured to form a seal with the filter seal member; and
a second member portion disposed between the first member end and the second member end, the second member portion disposed radially away from the first member portion.

11. The filtration system of claim 10, wherein:
the first member portion and the second member portion are disposed within an annular cavity surrounding an outlet of the filter housing, and the first member portion and the second member portion comprise a unitary body formed of at least one of urethane, epoxy, and silicone.

12. The filtration system of claim 11, wherein the first member portion and the second member portion are chemically bonded to surfaces cooperating to define the annular cavity.

13. The filtration system of claim 9, wherein the filter element is a first filter element, the filter media is a first filter media and defines a filter media cavity, and the filter seal member is a first seal member, further comprising a second filter element disposed with the filter media cavity, the second filter element comprising:
a second filter element top filter end;
a second filter element bottom filter end disposed axially away from the second filter element top filter end;
second filter media disposed between the second filter element top filter end and the second filter element bottom filter end; and
a second seal member formed on the second filter element bottom filter end, the second seal member comprising a first plurality of second lobes and a second plurality of second lobes, each lobe in the second plurality of second lobes positioned between a pair of lobes in the first plurality of second lobes.

14. The filtration system of claim 13, wherein the seal channel of the housing seal member has an internal channel portion and an external channel portion, the external channel portion configured to receive the first seal member and the internal channel portion configured to receive the second seal member.

15. The filtration system of claim 9, wherein the filter housing defines an annular cavity positioned within the filter housing at the second housing end, the annular cavity including the housing seal member and configured to receive the filter seal member.

16. The filtration system of claim 15, wherein the annular cavity includes apertures extending through the filter housing at the second housing end, the housing seal member overmolded to the annular cavity such that portions of the housing seal member extend through the apertures and form a mechanical bond with the filter housing.

17. The filtration system of claim 15, wherein the housing seal member is chemically bonded to surfaces cooperating to define the annular cavity.

18. The filtration system of claim 9, wherein at least one lobe in the first plurality of lobes comprises a tab protruding away from the at least one lobe.

19. The filtration system of claim 18, wherein the first plurality of lobes are substantially equidistantly positioned about the filter seal member such that the filter seal member exhibits rotational symmetry of equal to or less than 180 rotational degrees.

20. The filtration system of claim 18, wherein the second plurality of lobes are asymmetrically positioned circumferentially about the filter seal member such that the filter seal member does not exhibit rotational symmetry.

21. The filtration system of claim 18, wherein the filter seal member is formed of a compliant seal material, the filter seal member further comprising a support member positioned within the compliant seal material and formed of a support material more rigid than the compliant seal material.

* * * * *